(12) United States Patent
Keeler et al.

(10) Patent No.: US 12,421,915 B2
(45) Date of Patent: Sep. 23, 2025

(54) FUEL SUPPLY SYSTEM

(71) Applicant: ROLLS-ROYCE plc, London (GB)

(72) Inventors: Benjamin J Keeler, Chesterfield (GB); Craig W Bemment, Derby (GB); Andrea Minelli, Derby (GB); Paul W Ferra, Derby (GB); Alastair G Hobday, Derby (GB); Andrew T Smith, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/753,116

(22) Filed: Jun. 25, 2024

(65) Prior Publication Data

US 2025/0198365 A1 Jun. 19, 2025

(30) Foreign Application Priority Data

Dec. 14, 2023 (GB) .................................. 2319156

(51) Int. Cl.
*F02K 3/06* (2006.01)
*F02C 7/36* (2006.01)
*F02C 9/18* (2006.01)

(52) U.S. Cl.
CPC .............. *F02K 3/06* (2013.01); *F02C 7/36* (2013.01); *F02C 9/18* (2013.01); *F05D 2240/35* (2013.01); *F05D 2260/213* (2013.01)

(58) Field of Classification Search
CPC .... F02C 7/36; F02C 7/224; F02C 9/18; F02K 3/06; F05D 2240/35; F05D 2260/213
See application file for complete search history.

(56) References Cited

U.S. PATENT DOCUMENTS

| | | | |
|---|---|---|---|
| 6,939,392 B2* | 9/2005 | Huang .................. | B01D 65/08 96/6 |
| 2004/0011052 A1* | 1/2004 | Clements ................ | F02C 9/263 60/773 |
| 2005/0081507 A1* | 4/2005 | Tumelty .................. | F01D 25/20 60/39.08 |
| 2005/0155353 A1 | 7/2005 | Sabatino et al. | |
| 2016/0201563 A1 | 7/2016 | Stearns et al. | |

(Continued)

OTHER PUBLICATIONS

Andreas Linke-Diesinger, "Systems of Commercial Turbofan Engines: An Introduction to Systems Functions," © 2008 Springer-Verlag Berlin Heidelberg, pp. 77-82. (Year: 2008).*

(Continued)

*Primary Examiner* — David P. Olynick
(74) *Attorney, Agent, or Firm* — Oliff PLC

(57) ABSTRACT

A gas turbine engine for an aircraft includes an engine core including a turbine, a combustor, a compressor, and a core shaft connecting the turbine to the compressor. The engine includes a fan located upstream of the engine core and arranged to be driven by the core shaft. The engine includes a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4. The engine includes a plurality of actuators and a fuel supply system arranged to supply fuel to fueldraulically drive at least one actuator of the plurality of actuators. The engine includes two fuel-oil heat exchangers.

19 Claims, 16 Drawing Sheets

(56) References Cited

U.S. PATENT DOCUMENTS

| | | | |
|---|---|---|---|
| 2017/0030266 A1* | 2/2017 | Cerny | F02C 7/224 |
| 2017/0058774 A1* | 3/2017 | Pickford | F02C 7/16 |
| 2017/0159569 A1* | 6/2017 | Miller | F02C 7/06 |
| 2017/0175675 A1* | 6/2017 | Sabnis | F02C 3/04 |
| 2019/0170016 A1 | 6/2019 | Stearns et al. | |
| 2019/0316488 A1* | 10/2019 | Menczykalski | F02C 7/06 |
| 2022/0195927 A1* | 6/2022 | Rambo | F02C 7/232 |
| 2022/0381187 A1 | 12/2022 | Cocks et al. | |
| 2023/0323822 A1 | 10/2023 | Bemment et al. | |
| 2023/0332543 A1 | 10/2023 | Bemment et al. | |

OTHER PUBLICATIONS

Rolls-Royce Cleen II Sustainable Aviation Fuels—Public Version, DTFAWA-15-A-80012, Oct. 2021 (Year: 2021).*

* cited by examiner

FUEL SUPPLY SYSTEM

CROSS-REFERENCE TO RELATED APPLICATIONS

This specification is based upon and claims the benefit of priority from UK Patent Application Number 2319152.6 filed on 14 Dec. 2023, the entire contents of which are incorporated herein by reference.

BACKGROUND

Field of the Disclosure

The present disclosure relates to aircraft actuation systems, and to methods of actuating actuation system fueldraulically.

Description of the Related Art

There is an expectation in the aviation industry of a trend towards the use of fuels different from the traditional kerosene-based jet fuels generally used at present. The fuels may have differing fuel characteristics relative to petroleum/fossil-based hydrocarbon fuels. Thus, there is a need to take account of fuel properties for these new fuels, and to adjust both the gas turbine engines themselves and the methods of operating gas turbine engines.

SUMMARY

According to a first aspect, there is provided a gas turbine engine for an aircraft comprising:
   an engine core comprising a turbine, a combustor, a compressor, and a core shaft connecting the turbine to the compressor;
   a fan located upstream of the engine core and arranged to be driven by the core shaft, the fan comprising a plurality of fan blades;
   a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
   a plurality of actuators; and
   a fuel supply system, wherein the fuel supply system is arranged to supply fuel for combustion in the combustor, and to supply fuel to fueldraulically drive at least one actuator of the plurality of actuators, and
   wherein the fuel supply system is arranged to be controlled to select between:
      causing the fuel to actuate at least one actuator; and
      causing the fuel to bypass the at least one actuator, based on sustainable aviation fuel—SAF—content of the fuel.

The inventors have appreciated that the use of fuels different from the traditional kerosene-based jet fuels, such as sustainable aviation fuels, may result in different fuel properties, and that these different fuel properties may enable actuators to be fueldraulically driven. In particular, some fuels may be heated to higher temperatures and used to drive at least one more actuator than traditional fuels, without significantly increasing the risk of thermal degradation of the fuel (e.g., fuel lacquer, or fuel coking) within the actuators.

The bypass ratio is greater than or equal to 4, and may be in the range of 4-55. The bypass ratio may be in the range of 4-20. The bypass ratio may be in the range of 4-15.

The fuel system may be arranged to:
   cause the fuel to actuate the at least one actuator when the SAF content of the fuel is above a threshold; and
   cause the fuel to bypass that actuator when the SAF content of the fuel is below a threshold.

The fuel system may be arranged to select between actuating or bypassing multiple fueldraulic actuators based on the SAF content of the fuel. One or more of the fueldraulic actuators may have a different threshold from each other—for example, the fuel system may be arranged to cause the fuel to actuate a first actuator when the SAF content of the fuel is above a first threshold or to bypass that actuator otherwise, and to cause the fuel to actuate a second actuator when the SAF content of the fuel is above a second threshold which is higher than the first threshold, or to bypass that actuator otherwise.

The core shaft may output drive to the fan directly, so as to drive the fan at the same rotational speed as core shaft. Such an engine may be a direct drive turbine engine.

The turbine engine may comprise a gearbox that receives an input from the core shaft and outputs drive to the fan so as to drive the fan at a lower rotational speed than the core shaft. Such an engine may be a geared turbine engine.

The engine may comprise a turbine case cooling—TCC—system. The plurality of actuators may comprise an actuator which is part of the turbine case cooling system. The fuel supply system may be configured to actuate or bypass the actuator which is part of a turbine case cooling system based on the SAF content of the fuel. At least two of the plurality of actuators may be a part of the turbine case cooling system. The fuel supply system may be arranged to supply fuel to fueldraulically drive the at least two of the plurality of actuators which are part of the TCC system. The fuel supply system may be configured to actuate or bypass the at least two actuators which are part of a turbine case cooling system based on the SAF content of the fuel.

The engine may comprise a cabin bleed valve. The plurality of actuators may comprise an actuator configured to actuate the cabin bleed valve. The fuel supply system may be configured to actuate or bypass the actuator configured to actuate the cabin bleed valve based on the SAF content of the fuel.

The engine may comprise a handling bleed valve. The plurality of actuators may comprise an actuator configured to actuate the handling bleed valve. The fuel supply system may be configured to actuate or bypass the handling bleed valve based on the SAF content of the fuel.

The engine may comprise an engine heat management system comprising a valve. The plurality of actuators may comprise an actuator configured to actuate the valve within the engine heat management system. The fuel supply system may be configured to actuate or bypass the valve within the engine heat management system based on the SAF content of the fuel.

The engine heat management system may comprise a heat exchanger. The heat exchanger may be an air-oil heat exchanger. The fuel supply system may be configured to actuate or bypass a valve on the air-side of the heat exchanger based on the SAF content of the fuel. The fuel supply system may be configured to actuate or bypass a valve on the oil-side of the heat exchanger based on the SAF content of the fuel. The heat exchanger may be a fuel-oil heat exchanger. The fuel supply system may be configured to actuate or bypass a valve on the fuel-side of the fuel-oil heat exchanger based on the SAF content of the fuel. The fuel supply system may be configured to actuate or bypass a valve on the oil-side of the fuel-oil heat exchanger based on the SAF content of the fuel.

The engine may comprise a generator heat management system comprising a valve. The plurality of actuators may comprise an actuator configured to actuate the valve within the generator heat management system. The fuel supply system may be configured to actuate or bypass the valve within the generator heat management system based on the SAF content of the fuel.

The generator heat management system may comprise a heat exchanger. The heat exchanger may be an air-oil heat exchanger. The fuel supply system may be configured to actuate or bypass a valve on the air-side of the heat exchanger based on the SAF content of the fuel. The fuel supply system may be configured to actuate or bypass a valve on the oil-side of the heat exchanger based on the SAF content of the fuel. The heat exchanger may be a fuel-oil heat exchanger. The fuel supply system may be configured to actuate or bypass a valve on the fuel-side of the fuel-oil heat exchanger based on the SAF content of the fuel. The fuel supply system may be configured to actuate or bypass a valve on the oil-side of the fuel-oil heat exchanger based on the SAF content of the fuel.

When the fuel supply system bypasses the at least one actuator, the at least one actuator may be actuated non-fueldraulically. When the actuator is actuated non-fueldraulically, it may be actuated using a non-fuel hydraulic liquid. The non-fuel hydraulic liquid may be supplied via a non-return valve to avoid mixing. The fuel may be supplied to the actuator using a non-return valve to avoid mixing. The actuator may instead be electrically or pneumatically actuated.

The fuel supply system may be arranged to cause the fuel to actuate the at least one actuator when the SAF content is above a threshold. The fuel supply system may be arranged to cause the fuel to bypass the at least one actuator when the SAF content is below the threshold.

The minimum SAF content required for actuation of the at least one actuator may be at least 25%, 30%, 35%, 40%, 45%, 50%, 52%, 55%, 60%, 65%, 70%, or 75% by volume.

The fuel supply system may be arranged to be controlled to make the selection between fueldraulic actuation and bypass for two or more of the plurality of actuators. For example, the fuel supply system may be controllable to make the selection between fueldraulic actuation and bypass for two, three, four, or five actuators.

When the at least one actuator is fueldraulically driven, the maximum differential operating pressure across that actuator during take-off conditions may be in the range from 6,900 kPa to 10,000 kPa, or may be greater than 10,000 kPa. When the at least one actuator is fueldraulically driven, the maximum differential operating pressure during take-off conditions may be greater than 7,000 kPa, 8,000 kPa, 9,000 kPa, 10,000 kPa 11,000 kPa, 12,000 kPa, 13,000 kPa, 14,000 kPa, or greater than 15,000 kPa.

When the at least one actuator is fueldraulically driven, the maximum differential operating pressure during cruise conditions may be greater than or equal to 2400 kPa, greater than 2500 kPa, greater than 3000 kPa, greater than 3500 kPa, greater than 3800 kPa, or greater than 4000 kPa.

The same actuator may see significantly less pressure at idle—for example with a differential pressure in the range from 1000 kPa to 1250 kPa (150-180 psid).

According to a second aspect, there is provided a method of operating a gas turbine engine for an aircraft, the engine comprising:

an engine core comprising a turbine, a combustor, a compressor, and a core shaft connecting the turbine to the compressor;

a fan located upstream of the engine core and arranged to be driven by the core shaft, the fan comprising a plurality of fan blades;

a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;

a plurality of actuators; and a fuel supply system;

and wherein the method comprises:

supplying, using the fuel supply system, fuel for combustion in the combustor; and selecting between:

supplying, using the fuel supply system, fuel to at least one actuator of the plurality of actuators so as to fueldraulically actuate the at least one actuator; and using the fuel supply system, causing the fuel to bypass the at least one actuator, based on sustainable aviation fuel—SAF—content of the fuel.

The method may comprise:

supplying, using the fuel supply system, fuel to at least two of the plurality of actuators and, based on sustainable aviation fuel—SAF—content of the fuel, selecting for each of the at least two actuators (individually/independently) between:

causing the fuel to fueldraulically actuate the actuator; and causing the fuel to bypass the actuator.

The method may comprise:

supplying, using the fuel supply system, fuel to at least two of the plurality of actuators and, based on sustainable aviation fuel—SAF—content of the fuel, selecting between:

causing the fuel to fueldraulically actuate the at least two actuators; and causing the fuel to bypass the at least two actuators.

The bypass decision may therefore be a single decision made for all relevant actuators, or may be a series of decisions taken for individual actuators.

The bypass ratio may be in the range of 4-55. The bypass ratio may be in the range of 4-20. The bypass ratio may be in the range of 4-15.

The method of the second aspect may be performed using the engine of the first aspect.

The method may comprise increasing the fuel pressure flowing through the at least one fueldraulic actuator based on the SAF content of the fuel. For example, the pressure may be increased by at least 350 kPa for every 5% increase in % SAF above 60% (volumetric %). One or more pumps and/or valves may be used to increase the pressure.

According to a third aspect there is provided a gas turbine engine for an aircraft comprising:

an engine core comprising a turbine, a combustor, a compressor, and a core shaft connecting the turbine to the compressor;

a fan located upstream of the engine core and arranged to be driven by the core shaft, the fan comprising a plurality of fan blades;

a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;

a plurality of actuators; and a fuel supply system, wherein the fuel supply system is arranged to supply fuel for combustion in the combustor, and to supply fuel to fueldraulically drive at least one actuator of the plurality of actuators.

The fuel comprises at least 25% sustainable aviation fuel—SAF—by volume. The fuel supply system is arranged such that a peak differential pressure of the fuel across the at least one fueldraulic actuator during cruise conditions is at least 2400 kPa (350 psid).

It will be appreciated that, even at cruise conditions, differential pressure across an actuator will change depending on the operating conditions (e.g. fuel flow rate). The peak, or maximum, differential pressure is therefore selected for ease of comparison; this pressure is more specifically a steady-state peak differential pressure; i.e. any short-lived, transient, spikes in pressure are discounted. The steady-state peak value may therefore be a time-averaged pressure value, averaged over five, ten, fifteen, twenty, twenty five, or thirty seconds. The peak should last for a period of at least around five seconds, so excluding sharp transient spikes.

The peak differential pressure of the fuel across the at least one fueldraulic actuator during cruise conditions may be at least 2500 kPa, 2600 kPa, 2750 kPa, 3000 kPa, 3200 kPa, 3400 kPa, 3500 kPa, 3600 kPa, 3700 kPa, 3800 kPa, or 4000 kPa.

The peak differential pressure of the fuel across the at least one fueldraulic actuator during cruise conditions may be in the range from 2400 kPa to 4500 kPa, and optionally from 2500 kPa to 4000 kPA, or from 2500 kPa to 3800 kPA.

The bypass ratio is greater than or equal to 4, and may be in the range of 4-55. The bypass ratio may be in the range of 4-20. The bypass ratio may be in the range of 4-15.

When the at least one actuator is fueldraulically driven, the maximum differential operating pressure during take-off conditions may be in the range from 6,900 kPa to 10,000 kPa, or may be greater than 7,000 kPa, 8,000 kPa, 9,000 kPa, or 10,000 kPa.

The same actuator may see significantly less pressure at idle—for example with a differential pressure in the range from 1000 kPa to 1250 kPa (150-180 psid).

The core shaft may output drive to the fan directly, so as to drive the fan at the same rotational speed as core shaft, such that the engine is a direct drive turbine engine.

The turbine engine may comprise a gearbox that receives an input from the core shaft and outputs drive to the fan so as to drive the fan at a lower rotational speed than the core shaft, such that the engine is a geared turbine engine.

The fuel may comprise at least 50%, 55%, 60%, 65%, 70%, or 75% SAF by volume.

The at least one fueldraulic actuator may be a variable stator vane actuator.

The at least one fueldraulic actuator may be a variable inlet guide vane actuator.

The engine of the third aspect may comprise any or all features of the engine of the first aspect, and may be used to implement the method of the second aspect.

According to a fourth aspect there is provided a method of operating a gas turbine engine for an aircraft. The engine comprises:

an engine core comprising a turbine, a combustor, a compressor, and a core shaft connecting the turbine to the compressor;

a fan located upstream of the engine core and arranged to be driven by the core shaft, the fan comprising a plurality of fan blades;

a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;

a plurality of actuators; and a fuel supply system;

The method comprises:

supplying, using the fuel supply system, fuel for combustion in the combustor; and supplying, using the fuel supply system, fuel comprising at least 25% SAF by volume to fueldraulically drive at least one actuator of the plurality of actuators, the fuel being supplied such that a peak differential pressure of the fuel across the at least one fueldraulic actuator during cruise conditions is at least 2400 kPa.

Fuel of the same composition may be supplied to both the combustor and the at least one actuator. One or more controllable valves and/or pumps may be supplied to adjust the differential pressure of the fuel across the at least one fueldraulic actuator.

The peak differential pressure of the fuel across the at least one fueldraulic actuator during cruise conditions may be at least 2500 kPa.

The bypass ratio may be in the range of 4-55. The bypass ratio may be in the range of 4-20. The bypass ratio may be in the range of 4-15.

The method may comprise controlling the supply of fuel to the one or more fueldraulic actuators so as to adjust the peak differential pressure of the fuel across the at least one fueldraulic actuator based on the SAF content of the fuel.

The method may comprise supplying fuel comprising at least 50% SAF by volume, and controlling the fuel supply to the at least one actuator such that the peak differential pressure is at least 3200 kPa.

The method may comprise supplying fuel comprising at least 55% SAF by volume, and controlling the fuel supply to the at least one actuator such that the peak differential pressure is at least 3550 kPa or 3600 kPa.

The methods of the second and fourth aspects may be complementary, and may be performed together in various implementations. The method of the fourth aspect may be performed using the engine of the first aspect or the third aspect.

According to a fifth aspect, there is provided a gas turbine engine for an aircraft comprising:

an engine core comprising a turbine, a combustor, a compressor, and a core shaft connecting the turbine to the compressor;

a fan located upstream of the engine core and arranged to be driven by the core shaft, the fan comprising a plurality of fan blades;

a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
a plurality of actuators;
a fuel supply system, wherein the fuel supply system is arranged to supply fuel for combustion in the combustor, and to supply fuel to fueldraulically drive at least one actuator of the plurality of actuators, and
two fuel-oil heat exchangers arranged to have oil and the fuel flow therethrough, the heat exchangers being arranged to transfer heat from the oil to the fuel and comprising a primary fuel-oil heat exchanger arranged to heat at least the majority of the fuel, and a secondary fuel-oil heat exchanger arranged to provide additional heat to the fuel to be supplied to fueldraulically drive the at least one fueldraulic actuator.

The heat exchangers are controlled such that, under cruise conditions, a heat transfer ratio of:

$$\frac{\text{rate of heat transform from oil to fuel in the secondary fuel}-\text{oil heat exchanger}(kJkg^{-1})}{\text{rate of heat transform from oil to fuel in the primary and secondary fuel}-\text{oil heat exchangers}(kJkg^{-1})}$$

has a maximum value of at least 0.35.

Whilst it will be appreciated that the ratio is dimensionless, heat transfer is measured per unit mass or volume of fuel in the examples described herein (with units of kJ per kg being noted above by way of example), so providing a heat transfer rate normalised for fuel flow rate variations at cruise. It will be appreciated that the heat transfer is noted per unit mass (kg) of fuel reaching the combustor so as to adjust for fuel flow rate and any recirculation through one or more of the heat exchangers or bypass of one or more of the heat exchangers as described elsewhere herein. In most implementations, it may be assumed that any temperature rise of the fuel due to other engine components (as opposed to due to heat transfer from the oil) is minimal.

It will be appreciated that, even at cruise conditions, there may be short-lived, transient, spikes in heat transfer which should be discounted. The maximum value for the heat transfer ratio may therefore be a time-averaged value, averaged over one, two, five, ten, fifteen, twenty, twenty-five, or thirty minutes.

It will be appreciated that time scales for transient temperature changes may be greater than those for pressure in actuators-whereas the full movement of an actuator is likely to be completed within a few seconds, fuel and oil may spend longer within the heat exchangers.

The heat transfer ratio may have a maximum value at cruise greater than 0.4. The heat transfer ratio may have a maximum value at cruise greater than 0.45. The heat transfer ratio may have a maximum value at cruise greater than 0.5.

The bypass ratio is greater than or equal to 4, and may be in the range of 4-55. The bypass ratio may be in the range of 4-20. The bypass ratio may be in the range of 4-15.

The maximum temperature of the fuel exiting the secondary fuel-oil heat exchanger may be at least 150° C., 160° C., 170° C., or 180° C.

The primary and secondary heat exchangers may be arranged such that the heat transfer ratio is adjustable in operation of the engine, for example by controlling one or more pumps and/or valves so as to adjust fuel and/or oil flow through one or each heat exchanger.

The heat exchangers may be arranged such that the heat transfer ratio is adjustable based on the sustainable aviation fuel—SAF—content of the fuel.

The engine may comprise at least one bypass valve arranged to allow fuel or oil to bypass one of the fuel-oil heat exchangers, so as to adjust the heat transfer ratio.

For example, the engine may comprise one or more of:
a valve operable to enable oil to bypass the primary heat exchanger;
a valve operable to enable oil to bypass the secondary heat exchanger;
a valve operable to enable fuel to bypass the primary heat exchanger; and
a valve operable to enable fuel to bypass the secondary heat exchanger.

The engine may comprise at least one recirculation valve arranged to allow fuel or oil to pass through one of the fuel-oil heat exchangers multiple times, so as to adjust the heat transfer ratio.

For example, the engine may comprise one or more of:
a valve operable to enable oil to recirculate through the primary heat exchanger;
a valve operable to enable oil to recirculate through the secondary heat exchanger;
a valve operable to enable fuel to recirculate through the primary heat exchanger; and
a valve operable to enable fuel to recirculate through the secondary heat exchanger.

For any of the recirculation valves described herein, there may be one or more associated pumps configured to convey the oil/fuel back to the inlet of the heat exchanger, so as to pass through the heat exchanger again. Alternatively, or additionally, any suitable components for repressurising the oil/fuel to enable recirculation may be used.

The core shaft may output drive to the fan directly, so as to drive the fan at the same rotational speed as core shaft, such that the engine is a direct drive turbine engine.

The engine of the fifth aspect may comprise any or all features of the engine of the first and/or third aspect, and may be used to implement the method of the second or fourth aspect.

According to a sixth aspect there is provided a method of operating a gas turbine engine for an aircraft.

The engine comprises:
an engine core comprising a turbine, a combustor, a compressor, and a core shaft connecting the turbine to the compressor;
a fan located upstream of the engine core and arranged to be driven by the core shaft, the fan comprising a plurality of fan blades;
a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
a plurality of actuators;
a fuel supply system; and
a primary fuel-oil heat exchanger and a secondary fuel-oil heat exchanger.

The method comprises:
supplying, using the fuel supply system, fuel for combustion in the combustor;
supplying, using the fuel supply system, fuel to fueldraulically drive at least one actuator of the plurality of actuators;

heating at least the majority of the fuel using the primary fuel-oil heat exchanger; and heating the fuel to be supplied to fueldraulically drive the at least one fueldraulic actuator using the secondary fuel-oil heat exchanger;

wherein, under cruise conditions, the supply and heating are controlled such that a heat transfer ratio of:

$$\frac{\text{rate of heat transform from oil to fuel in the secondary fuel} - \text{oil heat exchanger}(kJkg^{-1})}{\text{rate of heat transform from oil to fuel in the primary and secondary fuel} - \text{oil heat exchangers}(kJkg^{-1})}$$

has a maximum value of at least 0.35.

The bypass ratio may be in the range of 4-55. The bypass ratio may be in the range of 4-20. The bypass ratio may be in the range of 4-15.

The method may further comprise adjusting the heat transfer ratio—for example by adjusting fuel and/or oil flow rate through one or each heat exchanger-based on the sustainable aviation fuel—SAF—content of the fuel.

The methods of the second, fourth and sixth aspects may be complementary, and may be performed together, or in any combination or sub-combination, in various implementations. The method of the sixth aspect may be performed using the engine of the first aspect, third aspect, or fifth aspect.

According to a seventh aspect, there is provided a gas turbine engine for an aircraft comprising:

an engine core comprising a turbine, a combustor, a compressor, and a core shaft connecting the turbine to the compressor;

a fan located upstream of the engine core and arranged to be driven by the core shaft, the fan comprising a plurality of fan blades;

a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;

a plurality of actuators comprising a variable compressor vane actuator; and a fuel supply system, wherein the fuel supply system is arranged to supply fuel for combustion in the combustor, and to supply fuel to fueldraulically drive the variable compressor vane actuator, wherein the fuel is thermally stable at temperatures exceeding 280° C.

The bypass ratio is greater than or equal to 4, and may be in the range of 4-55. The bypass ratio may be in the range of 4-20. The bypass ratio may be in the range of 4-15.

Thermally stable may refer to the ability of the fuel to satisfy the requirement of a Jet Fuel Thermal Oxidation Test (JFTOT). Fuel which is thermally stable at temperature exceeding 280° C. may refer to fuel which satisfied the requirements of a JFTOT test at temperatures greater than or equal to 280° C.

The fuel may be thermally stable at temperatures equal to or exceeding 290° C., 295° C., 300° C., 305° C., 310° C., 315° C., 320° C., or 325° C.

Aircraft gas turbine engines generally comprise a plurality of compressor vanes—the variable compressor vane actuator is arranged to adjust the position of a compressor vane.

As the vane is used to guide airflow, and as the position of the compressor vane is variable, it may be referred to as a variable guide vane.

The variable guide vanes of various implementations may include either or both of:

variable inlet guide vanes (VIGVs), which are located upstream of/in front of the compressor's rotor blades, and arranged to guide and control airflow into the compressor; and other vanes-generally variable stator vanes (VSVs) which are located behind/downstream of the compressor's rotor blades, and arranged to guide and control airflow through the compressor.

The engine may comprise multiple variable stator vane actuators, which may each be fueldraulic. Further, the engine may comprise multiple compressors, each with at least one variable stator vane actuator.

The gas turbine engine may comprise a plurality of variable compressor vanes, and multiple variable compressor vane actuators. The fuel supply system may be arranged to supply fuel to fueldraulically drive the multiple variable compressor vane actuators.

The gas turbine engine may comprise at least two compressors, each compressor having at least one variable compressor vane and at least one variable compressor vane actuator associated therewith. The fuel supply system may be arranged to supply fuel to fueldraulically drive at least one variable compressor vane actuator of each compressor.

The engine may comprise a turbine case cooling system. The plurality of actuators may comprise a turbine case cooling actuator. The fuel supply system may be arranged to supply fuel to fueldraulically drive the turbine case cooling actuator.

An aircraft gas turbine engine generally comprises multiple servomotors (also referred to as servos), a servo being a rotary or linear actuator that allows for precise control of angular or linear position, velocity, and/or acceleration in a mechanical system. In a given engine, one, some, or all of the servos present may be fueldraulically actuated. One or more of the servos may comprise a sensor arranged to provide position feedback. A dedicated controller may be provided for the engine heat management system to control the one or more servos.

For example, the engine may comprise a servo within a hydro-mechanical unit. The plurality of actuators may comprise at least one actuator configured to actuate the servo within the hydro-mechanical unit. The fuel supply system may be arranged to supply fuel to fueldraulically drive the actuator configured to actuate the servo valve.

Aromatics may make up less than 5% of the volume of the fuel.

The calorific value of the fuel may be at least 43.5 MJkg$^{-1}$. The calorific value of the fuel may be at least 44 MJkg$^{-1}$.

The sulphur content of the fuel may be below 15 parts per million.

The fuel may be or comprise a HEFA fuel, i.e. a fuel made from Hydro-processed Esters and Fatty Acids.

The core shaft may output drive to the fan directly, so as to drive the fan at the same rotational speed as the core shaft, such that the engine is a direct drive turbine engine.

The turbine engine may comprise a gearbox that receives an input from the core shaft and outputs drive to the fan so as to drive the fan at a lower rotational speed than the core shaft, such that the engine is a geared turbine engine.

The engine of the seventh aspect may comprise any or all features of the engine of the first, third and/or fifth aspect, and may be used to implement the method of the second, fourth or sixth aspect.

According to an eighth aspect of the invention, there is provided a method of operating a gas turbine engine for an aircraft.

The engine comprises:
- an engine core comprising a turbine, a combustor, a compressor, and a core shaft connecting the turbine to the compressor;
- a fan located upstream of the engine core and arranged to be driven by the core shaft, the fan comprising a plurality of fan blades;
- a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;
- a plurality of actuators comprising a variable compressor vane actuator; and
- a fuel supply system.

The bypass ratio is greater than or equal to 4 and may be in the range of 4-55. The bypass ratio may be in the range of 4-20. The bypass ratio may be in the range of 4-15.

The method comprises:
- supplying, using the fuel supply system, fuel for combustion in the combustor; and
- supplying, using the fuel supply system, fuel to fueldraulically drive the variable compressor vane actuator of the plurality of actuators.

The fuel is thermally stable at temperatures exceeding 280° C.

The methods of the second, fourth, sixth, and eighth aspects may be complementary, and may be performed together, or in any combination or sub-combination, in various implementations. The method of the eighth aspect may be performed using the engine of the first aspect, third aspect, fifth aspect, or seventh aspect.

According to a ninth aspect, there is provided a gas turbine engine for an aircraft. The engine comprises:
- an engine core comprising a turbine, a combustor, a compressor, and a core shaft connecting the turbine to the compressor;
- a fan located upstream of the engine core and arranged to be driven by the core shaft, the fan comprising a plurality of fan blades;
- a nacelle surrounding the fan and the engine core and defining a bypass duct located radially outside of the engine core, where a bypass ratio, defined as the ratio of the mass flow rate of the flow through the bypass duct to the mass flow rate of the flow through the core at cruise conditions, is at least 4;
- a plurality of actuators;
- a fuel supply system, wherein the fuel supply system is arranged to supply fuel for combustion in the combustor, and to supply fuel to fueldraulically drive at least one actuator of the plurality of actuators; and
- at least one fuel-oil heat exchanger arranged to have oil and the fuel flow therethrough, the at least one heat exchanger being arranged to transfer heat from the oil to the fuel.

The at least one heat exchanger is arranged such that, at cruise, the fuel temperature on entry into the at least one actuator is at least 5° C. greater than the fuel temperature on entry to the combustor.

The bypass ratio is greater than or equal to 4, and may be in the range of 4-55. The bypass ratio may be in the range of 4-20. The bypass ratio may be in the range of 4-15.

The at least one heat exchanger may be arranged such that, at cruise, the fuel temperature on entry into the at least one actuator is at least 7° C., 10° C., 12° C., 15° C., 20° C., 25° C., or 30° C. greater than the fuel temperature on entry to the combustor.

The core shaft may output drive to the fan directly, so as to drive the fan at the same rotational speed as core shaft, such that the engine is a direct drive turbine engine.

The turbine engine may comprise a gearbox that receives an input from the core shaft and outputs drive to the fan so as to drive the fan at a lower rotational speed than the core shaft, such that the engine is a geared turbine engine.

The at least one heat exchanger may comprise a primary fuel-oil heat exchanger arranged to heat at least the majority of the fuel, and a secondary fuel-oil heat exchanger arranged to provide additional heat to the fuel to be supplied to fueldraulically drive the at least one fueldraulic actuator.

The primary and secondary fuel-oil heat exchangers may be controlled such that, under cruise conditions, a heat transfer ratio of:

$$\frac{\text{rate of heat transform from oil to fuel in}}{\text{rate of heat transform from oil to fuel in the primary and}}$$
$$\frac{\text{the secondary fuel}-\text{oil heat exchanger}(kJkg^{-1})}{\text{secondary fuel}-\text{oil heat exchangers}(kJkg^{-1})}$$

has a maximum value of at least 0.35.

The primary and secondary heat exchangers may be arranged such that the heat transfer ratio is adjustable in operation of the engine.

The gas turbine engine may comprise at least one of the following to provide adjustment of the heat transfer ratio in operation:
(i) at least one controllable oil bypass valve arranged to allow oil to bypass at least one of the primary and secondary fuel-oil heat exchanger; and
(ii) at least one controllable oil recirculation valve arranged to allow oil to recirculate through least one of the primary and secondary fuel-oil heat exchanger.

The fuel supply system may comprise a valve operable to enable fuel to bypass, or to recirculate through, the primary heat exchanger.

The fuel supply system may comprise a valve operable to enable fuel to bypass, or to recirculate through, the secondary heat exchanger.

The engine may be arranged to allow the heat transfer ratio to be adjusted based on the sustainable aviation fuel—SAF—content of the fuel. A higher heat transfer ratio may be allowed for higher fuel SAF contents.

The fuel supply system may comprise, or have connected thereto, a fuel source. The fuel source may be located outside of the engine—e.g. a tank in a main fuselage of an aircraft or on a wing of an aircraft—and may not be a part of the engine. The fuel supplied to the at least one actuator to fueldraulically drive the at least one actuator may be supplied to the combustor after actuation without returning to the fuel source. The fuel may therefore be recirculated around the engine, or used in multiple ways within the engine, without being returned to a fuel tank.

The fuel supplied to the combustor may comprise a mixture of fuel which has been passed through the at least one fuel-oil heat exchanger and fuel which has bypassed the at least one fuel-oil heat exchanger.

The engine of the ninth aspect may comprise any or all features of the engine of the first, third, fifth, and/or seventh aspect, and may be used to implement the method of the second, fourth, sixth, and/or eighth aspect.

According to a tenth aspect, there is provided a method of operating a gas turbine engine for an aircraft.

The engine comprises:

an engine core comprising a turbine, a combustor, a compressor, and a core shaft connecting the turbine to the compressor;

a fan located upstream of the engine core and arranged to be driven by the core shaft, the fan comprising a plurality of fan blades;

a nacelle surrounding the fan and the engine core and defining a bypass duct located radially outside of the engine core, where the bypass ratio, defined as the ratio of the mass flow rate of the flow through the bypass duct to the mass flow rate of the flow through the core at cruise conditions, is at least 4;

a plurality of actuators;

a fuel supply system, wherein the fuel supply system is arranged to supply fuel for combustion in the combustor, and to supply fuel to fueldraulically drive at least one actuator of the plurality of actuators; and at least one fuel-oil heat exchanger arranged to have oil and the fuel flow therethrough, the at least one heat exchanger being arranged to transfer heat from the oil to the fuel.

The method comprises controlling the at least one heat exchanger such that, at cruise, the fuel temperature on entry into the at least one actuator is at least 5° C. greater than the fuel temperature on entry to the combustor.

The bypass ratio may be in the range of 4-55. The bypass ratio may be in the range of 4-20. The bypass ratio may be in the range of 4-15.

The method may comprise determining at least one fuel characteristic of the fuel, and controlling a temperature difference between the fuel temperature on entry into the at least one actuator and the fuel temperature on entry to the combustor based on the at least one fuel characteristic.

The fuel supply system may obtain the fuel from a fuel source such as an aircraft fuel tank (which is generally outside of the engine); and the method may be such that the fuel supplied to the at least one actuator to fueldraulically drive the at least one actuator is supplied to the combustor after actuation without returning to the fuel source.

The gas turbine engine may comprise primary and secondary fuel-oil heat exchangers, and the method may comprise controlling the primary and secondary fuel-oil heat exchangers such that, under cruise conditions, a heat transfer ratio of:

$$\frac{\text{rate of heat transform from oil to fuel in}}{\text{the secondary fuel} - \text{oil heat exchanger} (kJkg^{-1})}{\text{rate of heat transform from oil to fuel in the primary and secondary fuel-oil heat exchangers} (kJkg^{-1})}$$

has a maximum value of at least 0.35.

The method may comprise controlling the primary and secondary fuel-oil heat exchangers so as to adjust the heat transfer ratio based on the sustainable aviation fuel—SAF—content of the fuel.

The methods of the second, fourth, sixth, eighth, and tenth aspects may be complementary, and may be performed together, or in any combination or sub-combination, in various implementations. The method of the tenth aspect may be performed using the engine of the first aspect, third aspect, fifth aspect, seventh aspect, or ninth aspect.

It will be appreciated that a feature described with respect to one aspect may be used in combination with any other aspect, mutatis mutandis.

As noted elsewhere herein, the present disclosure may apply to any relevant configuration of gas turbine engine. Such a gas turbine engine may be, for example, a turbofan gas turbine engine, an open rotor gas turbine engine (in which the propeller is not surrounded by a nacelle), a turboprop engine or a turbojet engine. Any such engine may or may not be provided with an afterburner. Such a gas turbine engine may be, for example, configured for land or marine-based power generation applications.

A gas turbine engine in accordance with any aspect of the present disclosure may comprise an engine core comprising a turbine, a combustor, a compressor, and a core shaft connecting the turbine to the compressor. Such a gas turbine engine may comprise a fan (having fan blades). Such a fan may be located upstream of the engine core. Alternatively, in some examples, the gas turbine engine may comprise a fan located downstream of the engine core, for example where the gas turbine engine is an open rotor or a turboprop engine (in which case the fan may be referred to as a propeller).

Where the gas turbine engine is an open rotor or a turboprop engine, the gas turbine engine may comprise two contra-rotating propeller stages attached to and driven by a free power turbine via a shaft. The propellers may rotate in opposite senses so that one rotates clockwise and the other anti-clockwise around the engine's rotational axis. Alternatively, the gas turbine engine may comprise a propeller stage and a guide vane stage configured downstream of the propeller stage. The guide vane stage may be of variable pitch. Accordingly, high pressure, intermediate pressure, and free power turbines respectively may drive high and intermediate pressure compressors and propellers by suitable interconnecting shafts. Thus, the propellers may provide the majority of the propulsive thrust.

Where the gas turbine engine is an open rotor or a turboprop engine, one or more of the propellor stages may be driven by a gearbox. The gearbox may be of the type described herein.

An engine according to the present disclosure may be a turbofan engine. Such an engine may be a direct-drive turbofan engine in which the fan is directly connected to the fan-drive turbine, for example without a gearbox, via a core shaft. In such a direct-drive turbofan engine, the fan may be said to rotate at the same rotational speed as the fan-drive turbine. Purely by way of example, the fan-drive turbine may be a first turbine, the core shaft may be a first core shaft, and the gas turbine engine may further comprise a second turbine and a second core shaft connecting the second turbine to the compressor. The second turbine, the compressor, and second core shaft may be arranged to rotate at a higher rotational speed than the first core shaft. In such an arrangement, the second turbine may be positioned axially upstream of the first turbine.

An engine according to the present disclosure may be a geared turbofan engine. In such an arrangement, the engine has a fan that is driven via a gearbox. Accordingly, such a gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only by the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. Such a gearbox may be a single stage. Alternatively, such a gearbox may be a compound gearbox, for example a compound planetary gearbox (which may have the input on the sun gear and the output on the ring gear, and thus be referred to as a "compound star" gearbox), for example having two stages of reduction.

The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a reduction ratio in the range of from 3.1 or 3.2 to 3.8. Purely by way of further example, the gearbox may be a "star" gearbox having a reduction ratio in the range 3.0 to 3.1. Purely by way of further example, the gearbox may be a "planetary" gearbox having a reduction ratio in the range 3.6 to 4.2. In some arrangements, the gear ratio may be outside these ranges.

In any gas turbine engine as described and/or claimed herein, fuel of a given composition or blend is provided to a combustor, which may be provided downstream of the fan and compressor(s) with respect to the flowpath (for example axially downstream). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other. For example, the gas turbine engine may be a direct-drive turbofan gas turbine engine comprising 13 or 14 compressor stages (in addition to the fan). Such an engine may, for example, comprise 3 stages in the first (or "low pressure") compressor and either 10 or 11 stages in the second (or "high pressure") compressor. By way of further example, the gas turbine engine may be a "geared" gas turbine engine (in which the fan is driven by a first core shaft via a reduction gearbox) comprising 11, 12 or 13 compressor stages (in addition to the fan). Such an engine may comprise 3 or 4 stages in the first (or "low pressure") compressor and 8 or 9 stages in the second (or "high pressure") compressor. By way of further example, the gas turbine engine may be a "geared" gas turbine engine having 4 stages in the first (or "low pressure") compressor and 10 stages in the second (or "high pressure") compressor.

The or each turbine (for example the first turbine and second turbine as described above) may comprise any number of stages, for example multiple stages. Each stage may comprise a row of rotor blades and a row of stator vanes, or vice versa, as required. The respective rows of rotor blades and stator vanes may be axially offset from each other. The second (or "high pressure") turbine may comprise 2 stages in any arrangement (for example regardless of whether it is a geared or direct-drive engine). The gas turbine engine may be a direct-drive gas turbine engine comprising a first (or "low pressure") turbine having 5, 6 or 7 stages. Alternatively, the gas turbine engine may be a "geared" gas turbine engine comprising a first (or "low pressure") turbine having 3 or 4 stages.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32 or 0.29 to 0.30. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 140 cm, 170 cm, 180 cm, 190 cm, 200 cm, 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches), 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 210 cm to 240 cm, or 250 cm to 280 cm, or 320 cm to 380 cm. Purely by way of non-limitative example, the fan diameter may be in the range of from 170 cm to 180 cm, 190 cm to 200 cm, 200 cm to 210 cm, 210 cm to 230 cm, 290 cm to 300 cm or 340 cm to 360 cm.

The rotational speed of the fan may vary in use. Generally, the rotational speed is lower for fans with a higher diameter. Purely by way of non-limitative example, the rotational speed of the fan at cruise conditions may be less than 3500 rpm, for example less than 2600 rpm, or less than 2500 rpm, or less than 2300 rpm. Purely by way of further non-limitative example, the rotational speed of the fan at cruise conditions for a "geared" gas turbine engine having a fan diameter in the range of from 200 cm to 210 cm may be in the range of from 2750 to 2900 rpm. Purely by way of further non-limitative example, the rotational speed of the fan at cruise conditions for a "geared" gas turbine engine having a fan diameter in the range of from 210 cm to 230 cm may be in the range of from 2500 to 2800 rpm. Purely by way of further non-limitative example, the rotational speed of the fan at cruise conditions for a "geared" gas turbine engine having a fan diameter in the range of from 340 cm to 360 cm may be in the range of from 1500 to 1800 rpm. Purely by way of further non-limitative example, the rotational speed of the fan at cruise conditions for a direct drive engine having a fan diameter in the range of from 190 cm to 200 cm may be in the range of from 3600 to 3900 rpm. Purely by way of further non-limitative example, the rotational speed of the fan at cruise conditions for a direct drive engine having a fan diameter in the range of from 300 cm to 340 cm may be in the range of from 2000 to 2800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip2}$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3 (for example for a geared gas turbine engine).

Gas turbine engines in accordance with the present disclosure may have any desired bypass ratio (BPR), where the bypass ratio is defined as the ratio of the mass flow rate of the flow through the bypass duct to the mass flow rate of the flow through the core. In some arrangements the bypass ratio at cruise conditions may be greater than (or on the order of) any of the following: 9. 9.5, 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio at cruise conditions may be in an inclusive range bounded by any two of the values in the previous sentence (i.e. the values may form upper or lower bounds), for example in the range of from 12 to 16, 13 to 15, or 13 to 14. Purely by way of non-limitative example, the bypass ratio at cruise conditions of a direct-drive gas turbine engine according to the present disclosure may be in the range of from 9:1 to 11:1. Purely by way of further non-limitative example, the bypass ratio at cruise conditions of a geared gas turbine engine according to the present disclosure may be in the range of from 12:1 to 15:1 The bypass duct may be at least substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure at the exit of the highest pressure compressor (before entry into the combustor) to the stagnation pressure upstream of the fan. By way of non-limitative example, the overall pressure ratio of a gas turbine engine as described and/or claimed herein at cruise conditions may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. Purely by way of non-limitative example, the overall pressure ratio at cruise conditions of a geared gas turbine engine having a fan diameter in the range of from 200 cm to 210 cm may be in the range of from 40 to 45. Purely by way of non-limitative example, the overall pressure ratio at cruise conditions of a geared gas turbine engine having a fan diameter in the range of from 210 cm to 230 cm may be in the range of from 45 to 55. Purely by way of non-limitative example, the overall pressure ratio at cruise conditions of a geared gas turbine engine having a fan diameter in the range of from 340 cm to 360 cm may be in the range of from 50 to 60. Purely by way of non-limitative example, the overall pressure ratio at cruise conditions of a direct-drive gas turbine engine having a fan diameter in the range of from 300 cm to 340 cm may be in the range of from 50 to 60.

Specific thrust of an engine may be defined as the net thrust of the engine divided by the total mass flow through the engine. In some examples, specific thrust may depend, for a given thrust condition, upon the specific composition of fuel provided to the combustor. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines. Purely by way of non-limitative example, the specific thrust of a geared gas turbine engine having a fan diameter in the range of from 200 cm to 210 cm may be in the range of from 90 $Nkg^{-1}s$ to 95 $Nkg^{-1}s$. Purely by way of non-limitative example, the specific thrust of a geared gas turbine engine having a fan diameter in the range of from 210 cm to 230 cm may be in the range of from 80 $Nkg^{-1}s$ to 90 $Nkg^{-1}s$. Purely by way of non-limitative example, the specific thrust of a geared gas turbine engine having a fan diameter in the range of from 340 cm to 360 cm may be in the range of from 70 $Nkg^{-1}s$ to 90 $Nkg^{-1}s$. Purely by way of non-limitative example, the specific thrust of a direct drive gas turbine engine having a fan diameter in the range of from 300 cm to 340 cm may be in the range of from 90 $Nkg^{-1}s$ to 120 $Nkg^{-1}s$.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 100 kN, 110 kN, 120 kN, 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of non-limitative example, a gas turbine as described and/or claimed herein may be capable of producing a maximum thrust in the range of from 155 kN to 170 kN, 330 kN to 420 kN, or 350 kN to 400 kN. Purely by way of non-limitative example, the maximum thrust of a geared gas turbine engine having a fan diameter in the range of from 200 cm to 210 cm may be in the range of from 140 kN to 160 kN. Purely by way of non-limitative example, the maximum thrust of a geared gas turbine engine having a fan diameter in the range of from 210 cm to 230 cm may be in the range of from 150 kN to 200 kN. Purely by way of non-limitative example, the maximum thrust of a geared gas turbine engine having a fan diameter in the range of from 340 cm to 360 cm may be in the range of from 370 kN to 500 kN. Purely by way of non-limitative example, the maximum thrust of a direct drive gas turbine engine having a fan diameter in the range of from 300 cm to 340 cm may be in the range of from 370 kN to 500 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. In some examples, TET may depend, for a given thrust condition, upon the specific composition of fuel provided to the combustor. At cruise conditions, the TET may be at least (or on the order of) any of the following: 1400K, 1450K, 1500K, 1520K, 1530K, 1540K, 1550K, 1600K or 1650K. Thus, purely by way of non-limitative example, the TET at cruise conditions of a geared gas turbine engine having a fan diameter in the range of from 200 cm to 210 cm may be in the range of from 1540K to 1600K. Purely by way of non-limitative example, the TET at cruise conditions of a geared gas turbine engine having a fan diameter in the range of from 210 cm to 230 cm may be in the range of from 1590K to 1650K. Purely by way of non-limitative example, the TET at cruise conditions of a geared gas turbine engine having a fan diameter in the range of from 340 cm to 360 cm may be in the range of from 1600K to 1660K. Purely by way of non-limitative example, the TET at cruise conditions of a direct drive gas turbine engine having a fan diameter in the range of from 300 cm to 340 cm may be in the range of from 1590K to 1650K. Purely by way of non-limitative example, the TET at cruise conditions of a direct drive gas turbine engine having a fan diameter in the range of from 300 cm to 340 cm may be in the range of from 1570K to 1630K.

The TET at cruise conditions may be in an inclusive range bounded by any two of the values in the previous sentence (i.e. the values may form upper or lower bounds), for example 1530K to 1600K. The maximum TET in use of the engine may be, for example, at least (or on the order of) any of the following: 1700K, 1750K, 1800K, 1850K, 1900K, 1950K, 2000K, 2050K, or 2100K. Thus, purely by way of non-limitative example, the maximum TET of a geared gas turbine engine having a fan diameter in the range of from 200 cm to 210 cm may be in the range of from 1890K to 1960K. Purely by way of non-limitative example, the maximum TET of a geared gas turbine engine having a fan diameter in the range of from 210 cm to 230 cm may be in the range of from 1890K to 1960K. Purely by way of non-limitative example, the maximum TET of a geared gas turbine engine having a fan diameter in the range of from 340 cm to 360 cm may be in the range of from 1890K to 1960K. Purely by way of non-limitative example, the maximum TET of a direct drive gas turbine engine having a fan diameter in the range of from 300 cm to 340 cm may be in the range of from 1935K to 1995K. Purely by way of non-limitative example, the maximum TET of a direct drive gas turbine engine having a fan diameter in the range of from 300 cm to 340 cm may be in the range of from 1890K to 1950K. The maximum TET may be in an inclusive range bounded by any two of the values in the previous sentence (i.e. the values may form upper or lower bounds), for example in the range of from 1800K to 1950K, or 1900K to 2000K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre composite. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades. Where the fan blades have a carbon fibre composite body, there may be 16 or 18 fan blades. Where the fan blades have a metallic body (for example aluminium-lithium or titanium-alloy), there may be 18, 20 or 22 fan blades.

As used herein, the terms idle, taxi, take-off, climb, cruise, descent, approach, and landing (or one or more portions thereof) have the conventional meaning and would be readily understood by the skilled person. Thus, for a given gas turbine engine for an aircraft, the skilled person would immediately recognise each term to refer to the entirety, or one or more portions, of an operating phase of the engine within a given mission of an aircraft to which the gas turbine engine is designed to be attached.

In this regard, ground idle may refer to an operating phase of the engine where the aircraft is stationary and in contact with the ground, but where there is a requirement for the engine to be running. During idle, the engine may be producing between 3% and 9% of the available thrust of the engine. In further non-limitative examples, the engine may be producing between 5% and 8% of available thrust. In further non-limitative examples, the engine may be producing between 6% and 7% of available thrust. Taxi may refer to an operating phase of the engine where the aircraft is being propelled along the ground by the thrust produced by the engine. During taxi, the engine may be producing between 5% and 15% of available thrust. In further non-limitative examples, the engine may be producing between 6% and 12% of available thrust. In further non-limitative examples, the engine may be producing between 7% and 10% of available thrust. Take-off may refer to an operating phase of the engine where the aircraft is being propelled by the thrust produced by the engine. At an initial stage within the take-off phase, the aircraft may be propelled whilst the aircraft is in contact with the ground. At a later stage within the take-off phase, the aircraft may be propelled whilst the aircraft is not in contact with the ground. During take-off, the engine may be producing between 90% and 100% of available thrust. In further non-limitative examples, the engine may be producing between 95% and 100% of available thrust. In further non-limitative examples, the engine may be producing 100% of available thrust.

Climb may refer to an operating phase of the engine where the aircraft is being propelled by the thrust produced by the engine. During climb, the engine may be producing between 75% and 100% of available thrust. In further non-limitative examples, the engine may be producing between 80% and 95% of available thrust. In further non-limitative examples, the engine may be producing between 85% and 90% of available thrust. In this regard, climb may refer to an operating phase within an aircraft flight cycle between take-off and the arrival at cruise conditions, the arrival at cruise conditions thus defining the onset of the cruise phase, or a portion thereof, of the aircraft flight. Additionally or alternatively, climb may refer to a nominal point in, or one or more nominal periods during, an aircraft flight cycle between take-off and landing, where a relative increase in altitude is required, which may require an additional thrust demand of the engine.

As used herein, cruise conditions, which may define the cruise phase (or a portion thereof) of the aircraft flight, have the conventional meaning and would be readily understood by the skilled person. In some examples, for a given gas turbine engine for an aircraft, cruise conditions may refer to an the operating point of the engine at mid-cruise of a given mission (which may be referred to in the industry as the "economic mission") of an aircraft to which the gas turbine engine is designed to be attached. In this regard, mid-cruise may be regarded as the point in an aircraft flight cycle at which 50% of the total fuel that is burned between top of climb and start of descent has been burned (which may be approximated by the midpoint—in terms of time and/or distance—between top of climb and start of descent). Cruise conditions may thus define an operating point, phase, or portion thereof, of the flight that provides a thrust that would ensure steady state operation (i.e. maintaining a constant altitude and/or a constant Mach Number), or at least a substantially steady state operation (i.e. maintaining an at least substantially constant altitude and/or an at least substantially constant Mach Number) of an aircraft to which it is designed to be attached, taking into account the number of engines provided to that aircraft. For example, where an engine is designed to be attached to an aircraft that has two engines of the same type, at cruise conditions the engine may provide half of the total thrust that would be required for steady state operation, or at least a substantially steady state operation, of that aircraft at mid-cruise.

In other words, for a given gas turbine engine for an aircraft, cruise conditions may be defined as the operating point of the engine that provides a specified thrust (required to provide—in combination with any other engines on the aircraft—a steady state operation, or at least a substantially steady state operation, of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions may be clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, the engine may provide a known required net thrust level. The known required net thrust level is, of course, dependent on the engine and its intended application and may be, for example, a value in the range of from 20 kN to 40 kN.

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

Furthermore, the skilled person would immediately recognise either or both of descent and approach to refer to an operating phase within an aircraft flight cycle between cruise and landing of the aircraft, with approach in particular forming part of the landing and take-off (LTO) phase. During either or both of descent and approach, the engine may be producing between 0% and 50% of available thrust. In further non-limiting examples, the engine may be producing between 25% and 40% of available thrust. In further non-limitative examples, the engine may be producing between 30% and 35% of available thrust. Additionally or alternatively, descent may refer to a nominal point in an aircraft flight cycle between take-off and landing, where a relative decrease in altitude is required, and which may require a reduced thrust demand of the engine.

According to an aspect, there is provided an aircraft comprising a gas turbine engine as described and/or claimed herein. The aircraft according to this aspect is the aircraft for which the gas turbine engine has been designed to be attached. Accordingly, cruise conditions according to this aspect may correspond to an operating point, phase, or portion thereof, of the aircraft flight, as defined elsewhere herein.

According to an aspect, there is provided a method of operating a gas turbine engine as described and/or claimed herein. The operation may be at any suitable condition, which may be as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at any suitable condition, for example the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter contained or described herein may be applied to any aspect and/or combined with any other feature or parameter contained or described herein.

Except where mutually exclusive, any parameter or value contained or described herein may be applied to and/or combined with any one or more further parameters and/or or values contained or described herein. For example, a first parameter or value contained or described herein (for example, parameter A) may be applied to and/or combined with any one or more further parameters and/or values contained or described herein (for example, any one or more of parameter B; parameter C; and parameter D, and so on) to express a product of their relationship. For example, the Skilled Person would understand that where parameter A is disclosed in separation to parameter B, a product of their relationship may be expressed as, for example, A/B, B/A, B*A, or any such further application, combination, or function of parameter A relative to parameter B, as required.

BRIEF DESCRIPTION OF THE DRAWINGS

Embodiments will now be described by way of example only, with reference to the Figures, in which.

DETAILED DESCRIPTION OF THE DISCLOSURE

Figure 1:
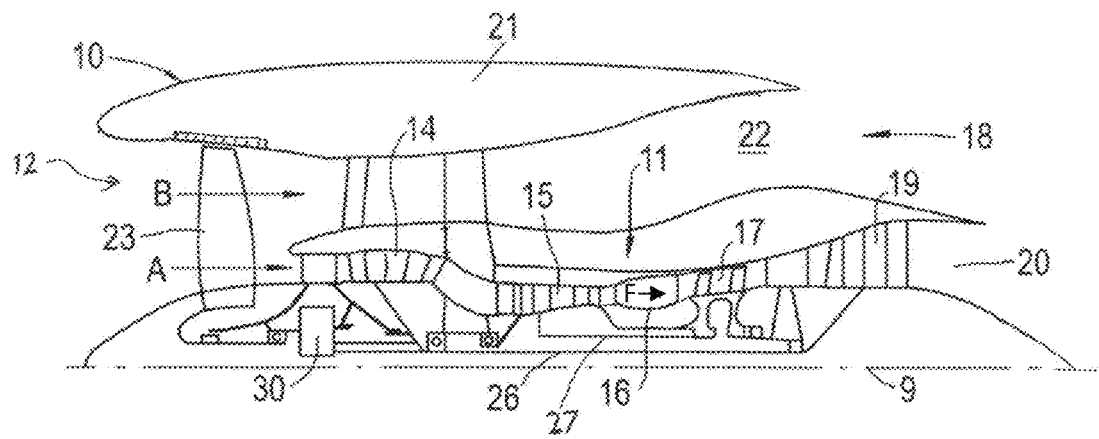
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally acts to impart increased pressure to the bypass airflow B flowing through the bypass duct 22, such that the bypass airflow B is exhausted through the bypass exhaust nozzle 18 to generally provide the majority of the propulsive thrust. The epicyclic gearbox 30 is a reduction gearbox.

Figure 2:
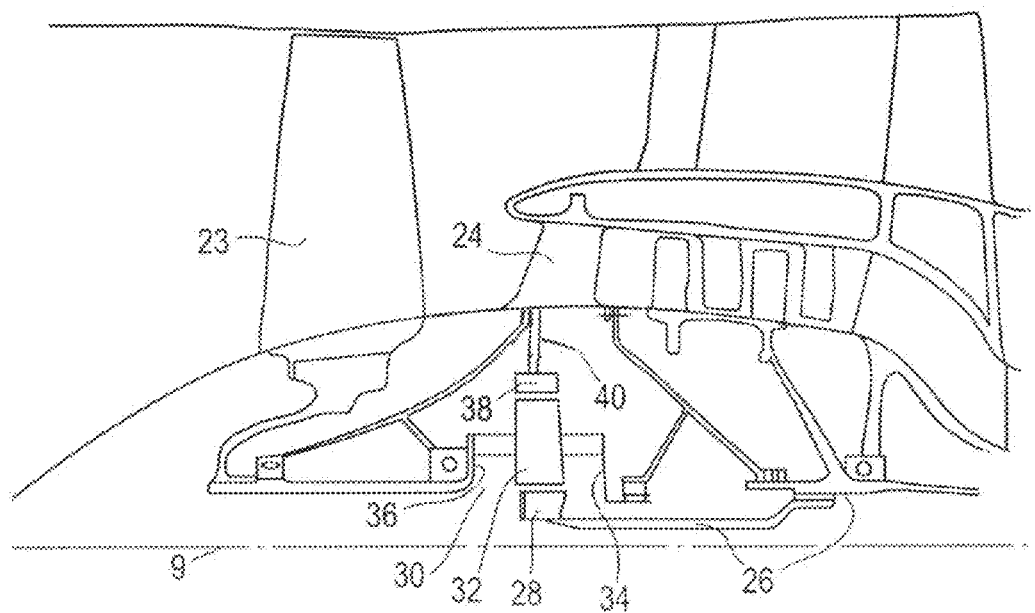
FIG. 2 is a close up sectional side view of an upstream portion of a geared gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
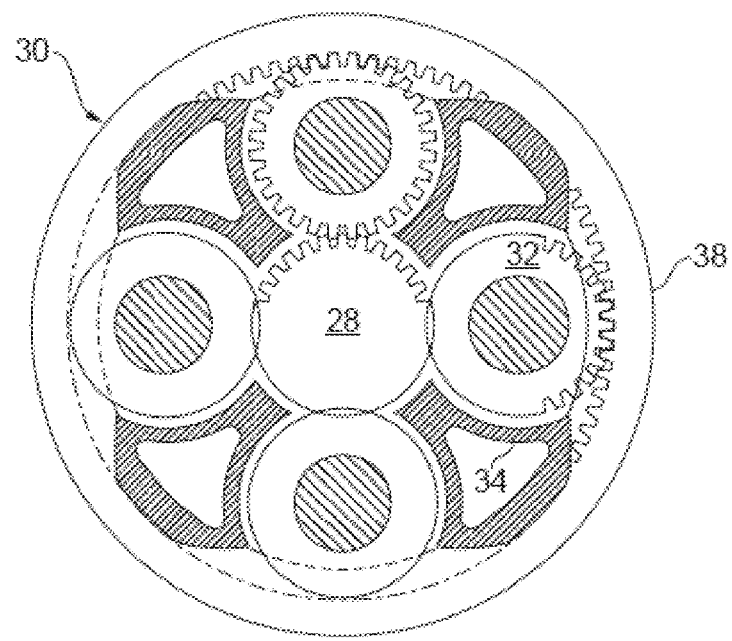
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area.

By way of further example, other gas turbine engines to which the present disclosure may be applied may have no gearbox for the main shaft(s), instead being direct drive engines. A cross-sectional view of one such engine is shown in FIG. 4.

Figure 4:
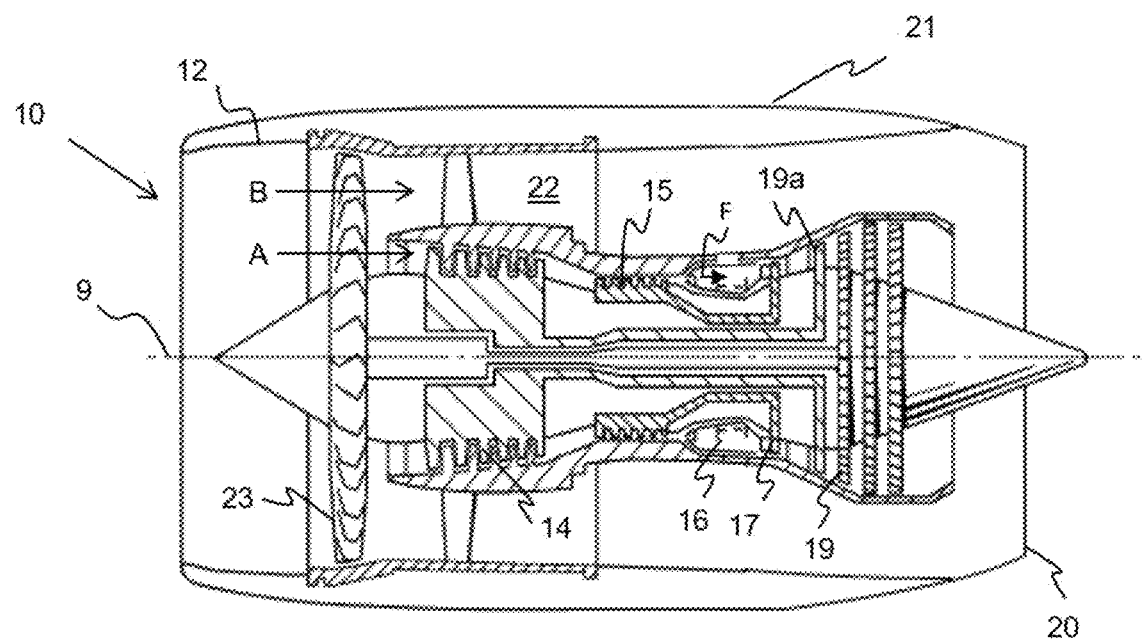
FIG. 4 is a close up sectional side view of an upstream portion of a direct drive gas turbine engine.

With reference to FIG. 4, a gas turbine engine is generally indicated at 10, having a principal rotational axis 9. The engine 10 comprises, in axial flow series, an air intake 12, a propulsive fan 23, an intermediate pressure compressor 14, a high pressure compressor 15, combustion equipment 16, a high pressure turbine 17, an intermediate pressure turbine 19a, a low-pressure turbine 19 and an exhaust nozzle 20. A nacelle 21 surrounds the engine 10 and defines both the intake 12 and the exhaust nozzle 20.

In use, air entering the intake 12 is accelerated by the fan 23 to produce two air flows: a core airflow A and a bypass airflow B. The core airflow A flows into the intermediate pressure compressor 14, and the bypass air flow B passes through a bypass duct 22 to provide propulsive thrust. The intermediate pressure compressor 14 compresses the airflow A before delivering that air to the high pressure compressor 15 where further compression takes place.

The compressed air exhausted from the high-pressure compressor 15 is directed into the combustion equipment 16 where it is mixed with fuel F and the mixture is combusted. The combustion equipment 16 may be referred to as the combustor 16, with the terms "combustion equipment 16" and "combustor 16" used interchangeably herein. The resultant hot combustion products then expand through, and thereby drive, the high, intermediate, and low-pressure turbines 17, 19a, 19 before being exhausted through the nozzle 20 to provide additional propulsive thrust. The high 17, intermediate 19a and low 19 pressure turbines drive respectively the high pressure compressor 15, intermediate pressure compressor 14 and fan 23, each by a suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

The fuel F provided to the combustion equipment 16 may comprise a fossil-based hydrocarbon fuel, such as Kerosene. Thus, the fuel F may comprise molecules from one or more of the chemical families of n-alkanes, iso-alkanes, cycloalkanes, and aromatics. Additionally or alternatively, when blended with, mixed with, or replaced by an alternative fuel, the fuel F may comprise renewable hydrocarbons produced from biological or non-biological resources, otherwise known as sustainable aviation fuel (SAF). In each of the provided examples, the fuel F may comprise one or more trace elements including, for example, sulphur, nitrogen, oxygen, inorganics, and metals.

SAF is understood by the Skilled Person to refer to, for example, a biofuel, renewable aviation fuel, renewable jet fuel, alternative fuel or biojet fuel, produced from biological or non-biological resources. SAF is understood to be commonly synthesised from carbon-containing gasses drawn out of the atmosphere and/or captured from industrial processes; or from a wide range of sustainable feedstocks such as, for example, waste oil and fats; municipal solid waste; cellulosic waste (such as corn stalks); cover crops such as camelina, carinata, and pennycress; non-biogenic alternative fuels; jatropha; halophytes and algae, rather than from fossil-based hydrocarbons. SAF is understood as not encompassing fossil fuels.

Functional performance of a given fuel composition, or blend of fuel F for use in a given mission, may be defined, at least in part, by the ability of the fuel to service the Brayton cycle of the gas turbine engine 10. Parameters defining functional performance may include, for example, specific energy; energy density; thermal stability; and, emissions including gaseous and/or particulate matter. In this regard, particulate matter emissions may include soot particles created by the combustion of said fuel F, also known as non-volatile particulate matter (nvPM). Any reference herein to soot or smoke may apply equally to other types of particulate matter emissions known within the art. Gaseous emissions may include any one or more of nitrogen oxides (NOx); carbon monoxide (CO); carbon dioxide ($CO_2$); unburned hydrocarbons (UHC); sulphur oxides (SO) including, for example, sulphur dioxide ($SO_2$) and/or sulphur trioxide ($SO_3$); and, volatile organic compounds (VOC) created by the combustion of said fuel F. Any reference herein to gaseous emissions may apply equally to other types of gaseous emissions known within the art.

A relatively higher specific energy (i.e. energy per unit mass), expressed as MJ/kg, may at least partially reduce take-off weight, thus potentially providing a relative improvement in fuel efficiency. A relatively higher energy density (i.e. energy per unit volume), expressed as MJ/L, may at least partially reduce take-off fuel volume, which may be particularly important for volume-limited missions or military operations involving refuelling. A relatively higher thermal stability (i.e. inhibition of fuel to degrade or coke under thermal stress) may permit the fuel to sustain elevated temperatures in the engine and fuel injectors, thus potentially providing relative improvements in combustion efficiency. Reduced emissions, including particulate matter, may permit reduced contrail formation, whilst reducing the environmental impact of a given mission. Other properties of the fuel may also be key to functional performance. For example, a relatively lower freeze point (° C.) may allow long-range missions to optimise flight profiles; minimum aromatic concentrations (%) may ensure sufficient swelling of certain materials used in the construction of o-rings and seals that have been previously exposed to fuels with high aromatic contents; and, a maximum surface tension (mN/m) may ensure sufficient spray break-up and atomisation of the fuel.

The ratio of the number of hydrogen atoms to the number of carbon atoms in a molecule may influence the specific energy of a given composition, or blend of fuel. Fuels with higher ratios of hydrogen atoms to carbon atoms may have higher specific energies in the absence of bond strain. For example, fossil-based hydrocarbon fuels may comprise molecules with approximately 7 to 18 carbons, with a significant portion of a given composition stemming from molecules with 9 to 15 carbons, with an average of 12 carbons.

A number of sustainable aviation fuel blends have been approved for use. For example, some approved blends comprise blend ratios of up to 10% sustainable aviation fuel, whilst other approved blends comprise blend ratios of between 10% and 50% sustainable aviation fuel (the remainder comprising one or more fossil-based hydrocarbon fuels, such as Kerosene), with further compositions awaiting approval. However, there is an anticipation in the aviation industry that sustainable aviation fuel blends comprising up to (and including) 100% sustainable aviation fuel (SAF) will be eventually approved for use.

Sustainable aviation fuels may comprise one or more of n-alkanes, iso-alkanes, cyclo-alkanes, and aromatics, and may be produced, for example, from one or more of synthesis gas (syngas); lipids (e.g. fats, oils, and greases); sugars; and alcohols. Thus, sustainable aviation fuels may comprise either or both of a lower aromatic and sulphur content, relative to fossil-based hydrocarbon fuels. Additionally or alternatively, sustainable aviation fuels may comprise either or both of a higher iso-alkane and cyclo-alkane content, relative to fossil-based hydrocarbon fuels. In some examples, sustainable aviation fuels may comprise either or both of a density of between 90% and 98% that of kerosene and a calorific value of between 101% and 105% that of kerosene.

In some examples, the sustainable aviation fuel(s), or blend(s) provided to the combustion equipment 16 may be relatively lower in aromatic and/or other non-paraffinic content than that of kerosene. The sustainable aviation fuel may comprise an aromatic content of e.g. 30%, 20%, 15%, 10%, 8%, 5%, or less than 5%; e.g. 4%, 3%, 2%, 1%, or less than 1%; e.g. 0.75%, 0.5%, 0.25%, or less than 0.25%; e.g. 0.2%, 0.1%, or less than 0.1%; e.g. 0.01%, 0.001%, or 0%. The aromatic content of the sustainable aviation fuel may be in an inclusive figure or range bounded by or within any two of the values in the previous sentence (i.e. the values may form upper or lower bounds), e.g. 13.5%, 8.5%, 2.5%, 0.35%, 0.15%, 0.05%, 0.005%, or 0%; or 0% to 0.75%, 0% to 0.5%, or 0.1% to 0.25%; or 0.15% to 0.65%, 0.35% to 0.55%, or 0.035% to 0.055%; according to one or more of preference, fuel stock or supplier, and compositional variation therein.

Owing at least in part to the molecular structure of sustainable aviation fuels, sustainable aviation fuels may provide benefits including, for example, one or more of a higher specific energy (despite, in some examples, a lower energy density); higher specific heat capacity; higher thermal stability; higher lubricity; lower viscosity; lower surface tension; lower freeze point; lower soot emissions; lower NOx; and, lower $CO_2$ emissions, relative to fossil-based hydrocarbon fuels (e.g. when combusted in the combustion equipment 16). Accordingly, relative to fossil-based hydrocarbon fuels, such as Kerosene, sustainable aviation fuels may lead to either or both of a relative decrease in specific fuel consumption, and a relative decrease in maintenance costs.

Figure 5:
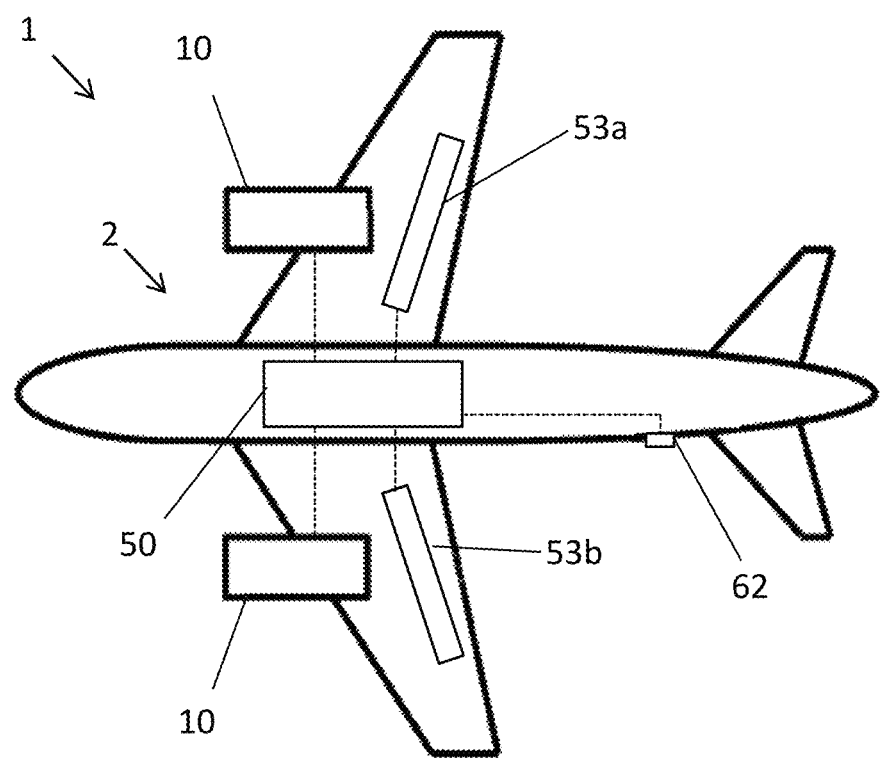
FIG. 5 is a representation of an aircraft with a propulsion system including two gas turbine engines.

As depicted in FIG. 5, an aircraft 1 may comprise multiple fuel tanks 50, 53a, b; for example a larger, primary fuel tank 50 located in the aircraft fuselage, and a smaller fuel tank 53a, 53b located in each wing. In other examples, an aircraft 1 may have only a single fuel tank 50, and/or the wing fuel tanks 53a, b may be larger than the central fuel tank 50, or no central fuel tank 50 may be provided (with all fuel instead being stored in the aircraft's wings)—it will be appreciated that many different tank layouts are envisaged and that the examples pictured are provided for ease of description and not intended to be limiting.

FIG. 5 shows an aircraft 1 with a propulsion system 2 comprising two gas turbine engines 10. The gas turbine engines 10 are supplied with fuel from a fuel supply system onboard the aircraft 1. The fuel supply system of the example pictured comprises a single fuel source. For the purposes of the present application the term "fuel source" means either 1) a single fuel tank or 2) a plurality of fuel tanks which are fluidly interconnected. Each fuel source is arranged to provide a separate source of fuel (i.e., a first fuel source may contain a first fuel having a different characteristic or characteristics from a second fuel contained in a second fuel source). First and second fuel sources are therefore not fluidly coupled to each other so as to separate the different fuels (at least under normal running conditions). The use of multiple fuel sources allows an aircraft 1 to carry multiple different fuels, and to change which fuel is being used during operation, and optionally even whilst at cruise or when changing between different stages of operation in flight.

In the present example, the first (and, in these examples, only) fuel source comprises a centre fuel tank 50, located primarily in the fuselage of the aircraft 1 and a plurality of wing fuel tanks 53a, 53b, where at least one wing fuel tank is located in the port wing and at least one wing fuel tank is located in the starboard wing for balancing. All of the tanks 50, 53a, b are fluidly interconnected in the example shown, so forming a single fuel source. Each of the centre fuel tank 50 and the wing fuel tanks 53a, b may comprise a plurality of fluidly interconnected fuel tanks.

In another example, the wing fuel tanks 53a, 53b may not be fluidly connected to the central tank 50, so forming a separate, second fuel source. For balancing purposes, one or more fuel tanks in the port wing may be fluidly connected to one or more fuel tanks in the starboard wing. This may be done either via a centre fuel tank (if that tank does not form part of the other fuel source), or bypassing the centre fuel tank(s), or both (for maximum flexibility and safety). In another example, the first fuel source comprises wing fuel tanks 53 and a centre fuel tank 50, while a second fuel source comprises a further separate centre fuel tank. Fluid interconnection between wing fuel tanks and the centre fuel tank of the first fuel source may be provided for balancing of the aircraft 1. In aircraft 1 with multiple fuel sources, two or more of the fuel sources may therefore contain different fuels from each other, such that the aircraft 1 can change fuel in flight. Being able to determine which fuel is being provided to the combustor 16 may therefore be more complex than simply recording a single identity of a fuel onboard the aircraft 1, or checking once at start-up.

In some examples, the allocation of fuel tanks 50, 53 available on the aircraft 1 may be constrained such that the first fuel source and the second fuel source are each substantially symmetrical with respect to the aircraft centre line. In cases where an asymmetric fuel tank allocation is permitted, a suitable means of fuel transfer is generally provided between fuel tanks of the first fuel source and/or between fuel tanks of the second fuel source such that the position of the aircraft's centre of mass can be maintained within acceptable lateral limits throughout the flight.

Aircraft generally refuel at multiple different airports, for example at the beginning and end of a long-distance flight. Whilst there are standards with which all aviation fuels must be compliant, as mentioned above, different aviation fuels have different compositions, for example depending on their source (e.g. different petroleum sources, biofuels or other synthetic aviation fuels (often described as sustainable aviation fuels-SAFs), and/or mixtures of petroleum-based fuels, and other fuels) and on any additives included (e.g. such as antioxidants and metal deactivators, biocides, static reducers, icing inhibitors, corrosion inhibitors) and any impurities. As well as varying between airports and fuel suppliers, fuel composition of the available aviation fuel may vary between batches even for a given airport or fuel supplier. Further, fuel tanks 50, 53 of aircraft 1 are usually not emptied before being topped up for a subsequent flight, resulting in mixtures of different fuels within the tanks-effectively a fuel with a different composition resulting from the mixture. One or more fuel ports 62 may be provided for refuelling.

Figure 6:
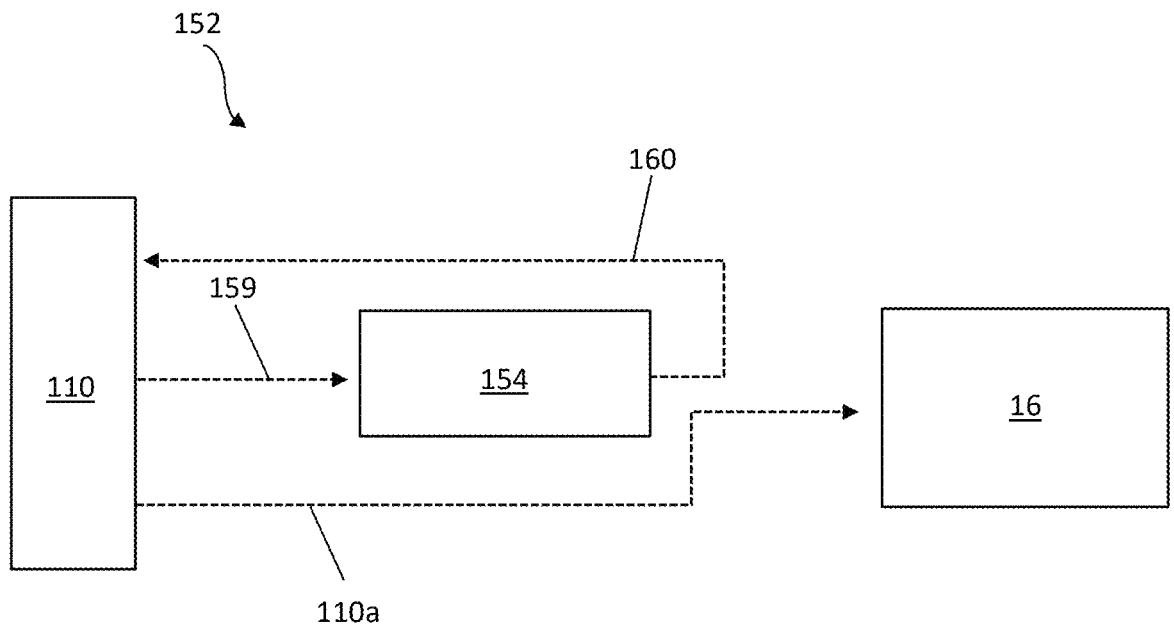
FIG. 6 is a schematic representing a fuel supply system comprising a fueldraulic actuator.

FIG. 6 shows a schematic diagram representing a portion of a fuel supply system 152 of a gas turbine engine 10. The fuel supply system 152 comprises a main fuel flow path 110 from the fuel tank 50 to the combustor 16 of the gas turbine engine 10, and various branching fuel pathways taking fuel from, or returning fuel to, that main fuel flow path 110.

The main fuel flow path 110 of the fuel supply system 152 acts as a source of fuel for fueldraulic systems. The gas turbine engine 10 comprises a combustor 16 and an actuator 154. The dashed arrows in FIG. 6 represent the direction of fuel flow. One or more fuel lines 159, 160 are provided to supply fuel to an actuator 154, so as to fuedraulically actuate it.

The fuel supply system 152 is arranged to supply fuel for combustion in the combustor 16.

It will be appreciated that one or more valves, pumps, sensors, offtakes for fueldraulic actuators, and heat exchangers may be present along the main fuel flow path 110, among other engine components. Fuel is supplied to the combustor 16 directly via line 110a, after passing through whichever prior engine component along the main fuel flow path 110 is furthest downstream.

The fuel travelling via lines 159 and 160 is used to drive (i.e., actuate) the actuator 154. As such, actuator 154 is fueldraulically driven. The term "fueldraulic" used herein refers to the hydraulic operation of an actuator with the hydraulic liquid being fuel. Actuators which are driven fueldraulically may be referred to herein as "fueldraulic actuators".

In the example shown in FIG. 6, fuel travels to the actuator 154 from the fuel flow path 110 via line 159. After being used to fueldraulically drive the actuator 154, the fuel is returned to the main fuel flow path 110, via line 160, and may then be delivered to the combustor 16.

The fuel return line 160 may comprise a valve configured to regulate the flow of fuel back to the main fuel path 110, and the valve may itself be operable using a fueldraulic actuator. The fuel return line 160 may direct fuel to a location along the main fuel flow path 110 which is before or after one or more heat exchangers of the main fuel flow path 110.

The fuel return line 160 may return fuel to the fuel tank. The valve may be a fuel return-to-tank valve in such implementations. The fuel return-to-tank valve may be controlled using a fuel return-to-tank actuator. The fuel supply system may be arranged to supply fuel to fueldraulically drive the fuel return-to-tank actuator.

Once the fuel reaches the combustor 16, it is combusted to provide thrust, as explained in relation to FIG. 1.

FIG. 6 shows a single fueldraulic actuator 154 on the fuel flow loop 159, 160. In alternative implementations, multiple fueldraulic actuators 154 may be located on a single fuel flow loop 159, 160, using fuel taken from a single point along the main fuel flow path 110. The multiple actuators may be arranged in series with respect to fuel flow (such that all of the fuel in the offtake pipe 159 passes through all actuators, in turn) or in parallel with respect to fuel flow (with the offtake pipe 159 branching and one or more actuators on each branch).

Figure 7:
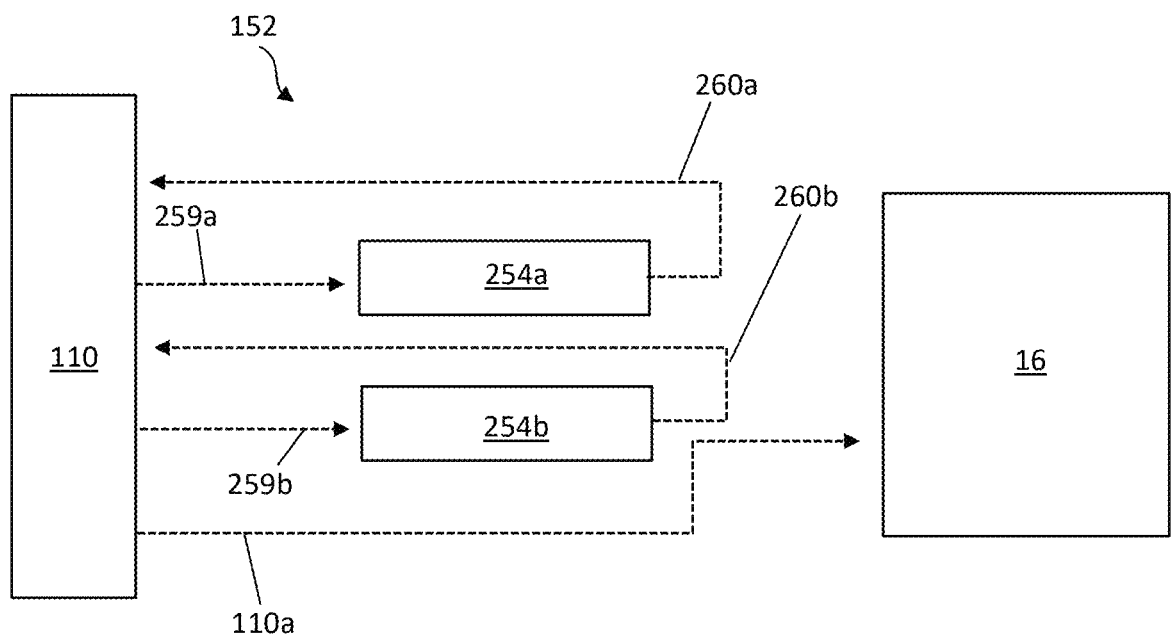
FIG. 7 is a schematic representing a fuel supply system comprising two fueldraulic actuators.

FIG. 7 shows a schematic diagram representing an alternative portion of a fuel supply system 152 of a gas turbine engine 10. The fuel supply system 152 comprises a fuel source 50, 53, which may be a single fuel tank or multiple fuel tanks, and a fuel flow path 110 between the fuel source 50,53 and the combustor 16. The fuel supply system 152 shown comprises two actuators 254a, b, each on a separate fuel offtake loop from the main fuel flow path 110. The dashed arrows in FIG. 7 represent the direction of fuel flow.

Both actuators 254a,b are fueldraulically driven. That is to say, both actuators 254a,b are hydraulically actuated using fuel from the fuel source 50, 53 as the hydraulic liquid. Fuel travels from the main fuel flow path 110 to the actuators 254a,b respectively via lines 259a,b. After the fuel has been used to drive the actuators 254a,b, it returns to the main fuel flow pathway 110 via lines 260a,b.

Only two actuators 254a,b are shown in FIG. 7 but, in other implementations, any plurality of actuators may be fueldraulically driven. In some implementation, the gas turbine engine 10 may comprise a plurality of fueldraulically driven actuators and a plurality of actuators which are not fueldraulically driven.

FIG. 7 shows a single fueldraulic actuator 254 on each fuel flow loop. In alternative implementations, multiple fueldraulic actuators 254 may be located on one or more of the multiple fuel flow loops. The multiple actuators may be arranged in series with respect to fuel flow (such that all of the fuel in the offtake pipe 159 passes through all actuators, in turn) or in parallel with respect to fuel flow (with the offtake pipe 159 branching and one or more actuators on each branch).

In various implementations, the gas turbine engine 10 comprises at least ten, eleven, twelve, thirteen, fourteen, fifteen, sixteen, seventeen, or eighteen fueldraulic actuators. In some implementations, each actuator may have its own dedicated fuel offtake pipe 159, 259 from the main fuel flow pathway 110, such that it has its own fuel flow loop. In other arrangements, two or more of these actuators may be located on the same fuel flow loop off the main fuel flow path 110. In some arrangements, most or all of the fueldraulic actuators may be located on the same fuel loop away from the main fuel flow path 110.

In various implementations, the gas turbine engine 10 comprises one or more actuated engine systems. Each actuated engine system may comprise one or more individual actuators. An "actuated engine system" (also referred to as an "actuated system") refers to a group of actuators which are used in conjunction to control a specific system, or perform a particular function, within the engine 10. An actuated system can be described as "fueldraulic" if at least one of its actuators is fueldraulic.

Figure 8:
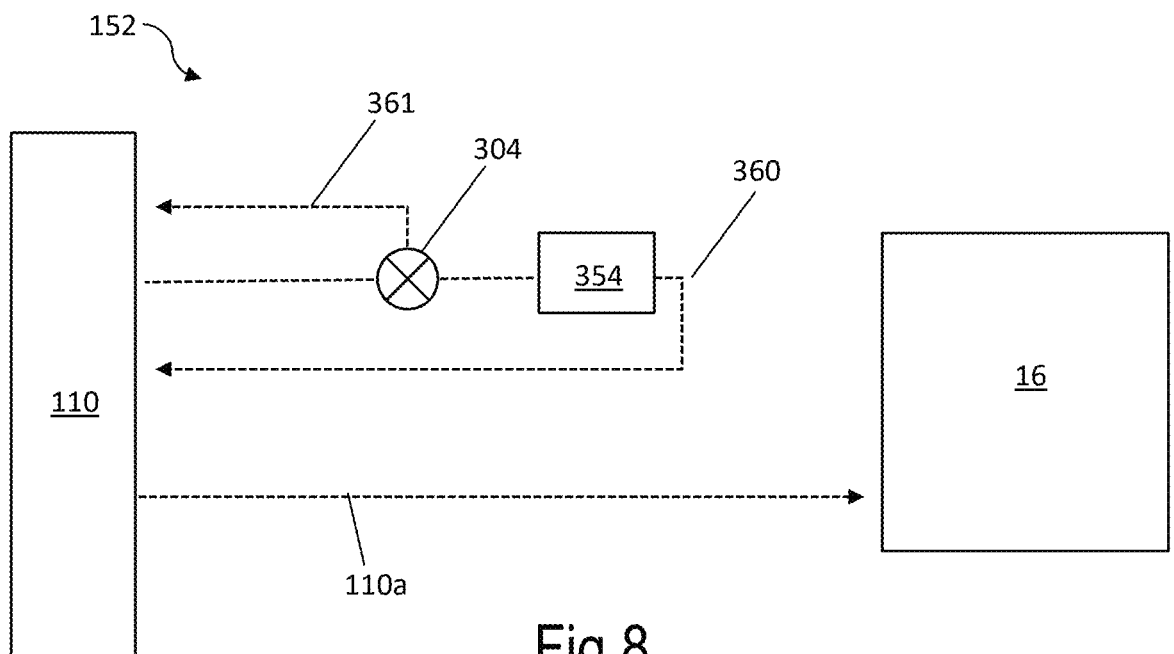
FIG. 8 is a schematic representing a fuel supply system comprising a selectively fueldraulic actuator.

FIG. 8 shows a fuel supply system 152 comprising an actuator 354.

FIG. 8 shows a schematic diagram representing an alternative portion of a fuel supply system 152 of a gas turbine engine 10. The fuel supply system 152 comprises a fuel source 50, 53, which may be a single fuel tank or multiple fuel tanks, and a fuel flow path 110 between the fuel source 50,53 and the combustor 16. The fuel supply system 152 shown comprises an actuator 354 on a fuel offtake loop from the main fuel flow path 110. The dashed arrows in FIG. 8 represent the direction of fuel flow.

The fuel supply system 152 of FIG. 8 comprises a valve 304. The valve 304 is configured to direct fuel via line 361 or line 360. Line 306 comprises the actuator 354, so fuel directed via line 306 fueldraulically drives the actuator 354, and is then returned to the main fuel flow path 110. Fuel directed via line 361 returns to the main fuel flow path 110 directly, without driving an actuator. The valve 304 may itself be controlled using a further fueldraulic actuator.

The valve 304 is controllable, meaning the fuel supply system 152 is arranged to be controlled to select between:
  causing the fuel to actuate the actuator 354 (fuel flowing via line 360); and
  causing the fuel to bypass the at least one actuator 354 (fuel flowing via line 361).

In some implementations, the valve 304 is controlled via an actuator according to output from a processor or other controller. The valve 304 may be controlled based on the sustainable aviation fuel—SAF—content of the fuel. In some implementations, the valve 304 can be substituted for any suitable alternative for regulating fuel flow between two lines 360, 361.

The fuel supply system 152 may be arranged to select between:
  causing the fuel to actuate the actuator 354 (via line 360); and
  causing the fuel to bypass the at least one actuator 354 (via line 361).

The selection may be made based on whether or not the sustainable aviation fuel—SAF—content of the fuel exceeds a threshold.

For example, the fuel supply system 152 may be arranged to cause the fuel to actuate the actuator 354 (via line 360) when the SAF content of the fuel exceeds 25%, 30%, 35%, 40%, 45%, 50%, 55%, 60%, 65%, 70%, 75%, 80%, 85%, 90%, or 95% concentration by volume.

The fuel supply system can control the fuel in a binary manner such that all of the fuel reaching valve 304 is directed into one of line 360 and line 361. In other implementations, fuel can be split between line 360 and line 361, for example.

To determine the SAF content of the fuel, the fuel supply system 152 may comprise a sensor. The sensor can be positioned immediately prior to the valve 304. In other implementations, the sensor can be positioned upstream of the valve 304 within the main fuel flow path 110. In alternative arrangements, the SAF content of the fuel is measured, or calculated, or otherwise provided, as the fuel is input into the fuel source 50, 53. For example, information on the SAF content of one or more fuels stored on the aircraft 1 may be electronically communicated to, or manually entered into a user interface of, an onboard controller or other computational system. It will be appreciated that any suitable approach known in the art for determining SAF content of fuel may be used.

Figure 9:
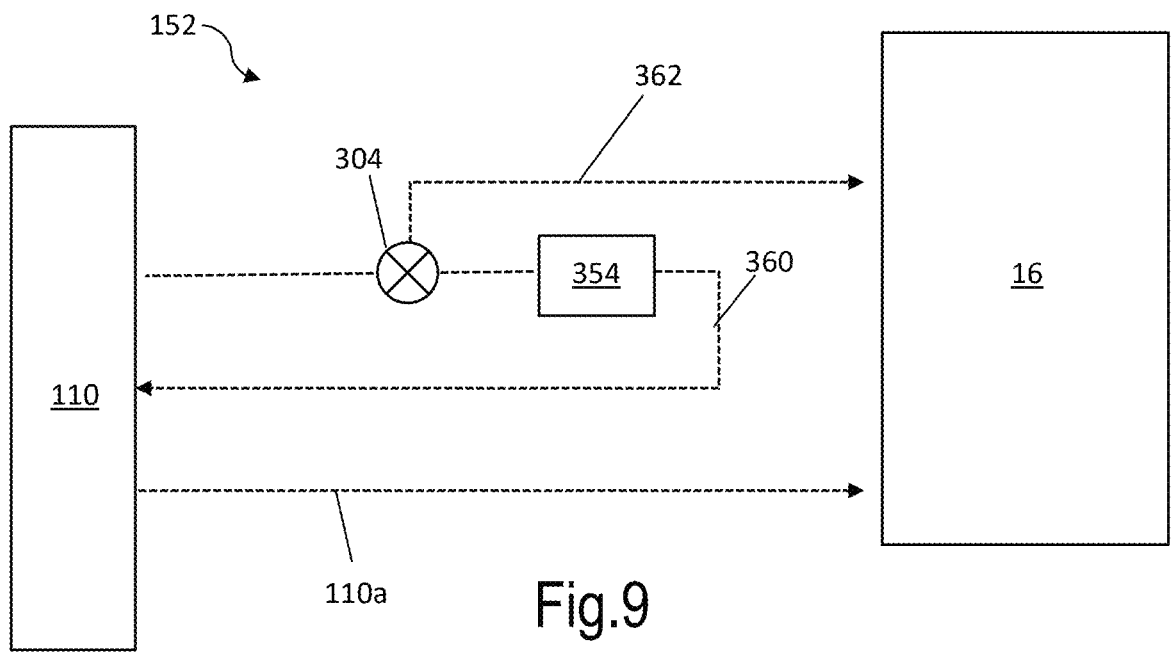
FIG. 9 is a schematic representing an alternative fuel supply system comprising a selectively fueldraulic actuator.

FIG. 9 shows a schematic diagram representing an alternative portion of a fuel supply system 152 of a gas turbine engine 10. The fuel supply system 152 is similar to the fuel supply system 152 of FIG. 8, but line 361 which returned fuel to the main fuel flow path 110 is replaced by line 362 which directs fuel to the combustor 16. The valve 304 directs fuel via one of lines 360 and 362. Line 362 directs fuel such that it bypasses the actuator 354 and travels to the combustor 16 without returning to the main fuel flow path 110. Line 362 may comprise one or more pumps or valves configured to regulate the pressure and flow rate of the fuel to the combustor 16.

In the implementations of FIGS. 8 and 9, the actuator 354 can be configured such that, when the valve 304 directs fuel so as to bypass the actuator 354, the actuator 354 is driven non-fueldraulically. For example, the actuator 354 may be driven using a non-fuel hydraulic liquid or using electrical signals.

Figure 10:
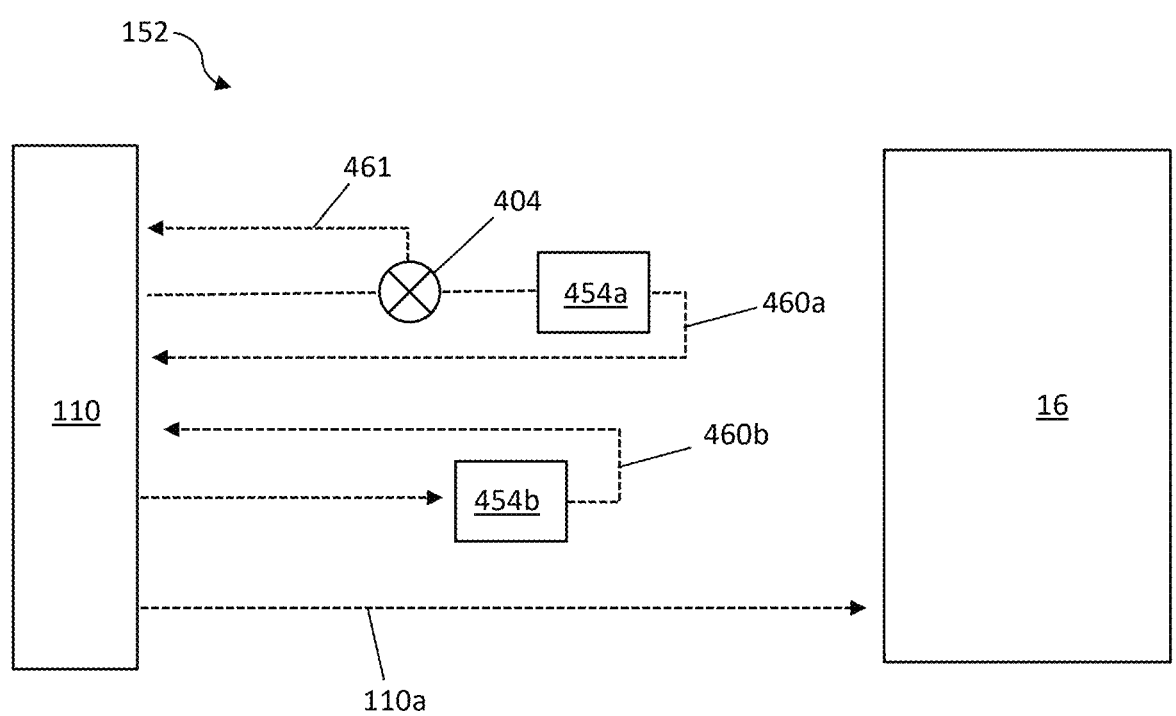
FIG. 10 is a schematic representing a further fuel supply system comprising two fueldraulic actuators, one of which is a selectively fueldraulic actuator.

FIG. 10 shows a schematic diagram representing an alternative portion of a fuel supply system 152 of a gas turbine engine 10. The fuel supply system 152 comprises a fuel source 50, 53, which may be a single fuel tank or multiple fuel tanks, and a fuel flow path 110 between the fuel source 50, 53 and the combustor 16. The fuel supply system 152 shown comprises two actuators 454a, b, each actuator 454a, b being positioned on a respective fuel offtake loop from the main fuel flow path 110. The dashed arrows in FIG. 10 represent the direction of fuel flow.

The first actuator 454a is positioned downstream of a valve 404 located on its respective fuel offtake loop. The valve 404 is configured to direct fuel via line 461 to bypass the actuator (returning to the main fuel flow path 110 directly) or line 460a to fueldraulically actuate the actuator 454a (and then return to the main fuel flow path 110). The valve 404 is arranged similarly to the valve 304 of FIG. 8 but, in other implementations, the valve 404 may be arranged similarly to the valve 304 of FIG. 9 such that the fuel bypassing the actuator is instead sent directly to the combustor 16. In still further implementations, all fuel taken from the main fuel flow path 110 and to the valve 304, 404 may be sent to the combustor 16, either directly or after passing through the actuator 354, 454a. The actuator 454a is therefore selectively fueldraulically driven.

In still further implementations, the selectively fueldraulically driven valve 354, 454a may not have multiple fuel routes associated therewith-instead, the valve 304, 404 may be arranged to block any fuel from leaving the main fuel flow path to head towards that actuator when the actuator 354, 454a is not to be fueldraulically driven. Flow through a simple loop may therefore be started or stopped by the valve 304, 404 rather than using the valve to divert fuel flow between two different offshoots of the main path. Similarly for implementations in which the same fuel offtake point from the main fuel flow path 110 is used to feed multiple fueldraulic actuators, a controllable valve arranged to permit or prevent fuel reaching a given actuator may either (i) divert fuel intended for that actuator along a dedicated bypass route when that actuator is not to be fueldraulically actuated, or (ii) simply block any route toward that actuator, so causing the fuel that would otherwise have flowed to that actuator to flow to one or more other actuators fed by the same offtake. Choosing not to actuate one actuator fueldraulically may therefore increase the fuel flow rate to one or more other actuators, unless total flow through the offtake portion of the fuel flow lines is also controlled.

The second actuator 454b of the example of FIG. 10 is located on a separate fuel flow loop to the first actuator 454a and fuel is taken from a different point in the main fuel flow path 110. The second actuator 454b is arranged to be fueldraulically driven all of the time (it only has a single mode of actuation).

Although the implementation of FIG. 10 shows one actuator 454a that is selectively driven and one actuator 454b that is always fueldraulically driven, in other implementations the fuel supply system 152 can comprise any number of actuators, and any of those actuators can be fueldraulic, non-fueldraulic, or selectively fueldraulic. Any number of actuators may be contained in the same fuel flow loop.

The actuators described above can be any actuator used by the engine 10. Various specific actuators which may be fueldraulically driven are described below. The actuation systems described herein can be any actuation system used by the aircraft. Various specific actuation systems which may be fueldraulically driven are described below. It will be appreciated that the specific implementations listed are described by way of example only, and that the scope of protection is limited only by the claims.

An example of an actuated system is a Turbine Case Cooling (TCC) system. Turbine engines 10 typically comprise a casing surrounding the turbine 17, 19 and a TCC system is used to selectively cool this casing. This cooling may be used to control rotor-stator tip clearances by reducing the amount of thermal expansion. A TCC system comprises one or more valves operable to modulate the flow of bleed air from the engine's compressor 17, 19 across the casing to provide cooling.

In engines 10 with multiple turbines 17, 19, a TCC system may be provided for one, some, or all, turbines.

The one or more valves of the TCC system(s) are operable via an actuator. Each valve may have a dedicated actuator, or one actuator may control multiple valves. In various implementations, one or more of the actuators of a TCC system are fueldraulically driven. In one or more implementations, the fuel supply system may be arranged to selectively bypass or fueldraulically actuate one or more actuators of the TCC system.

Figure 11:
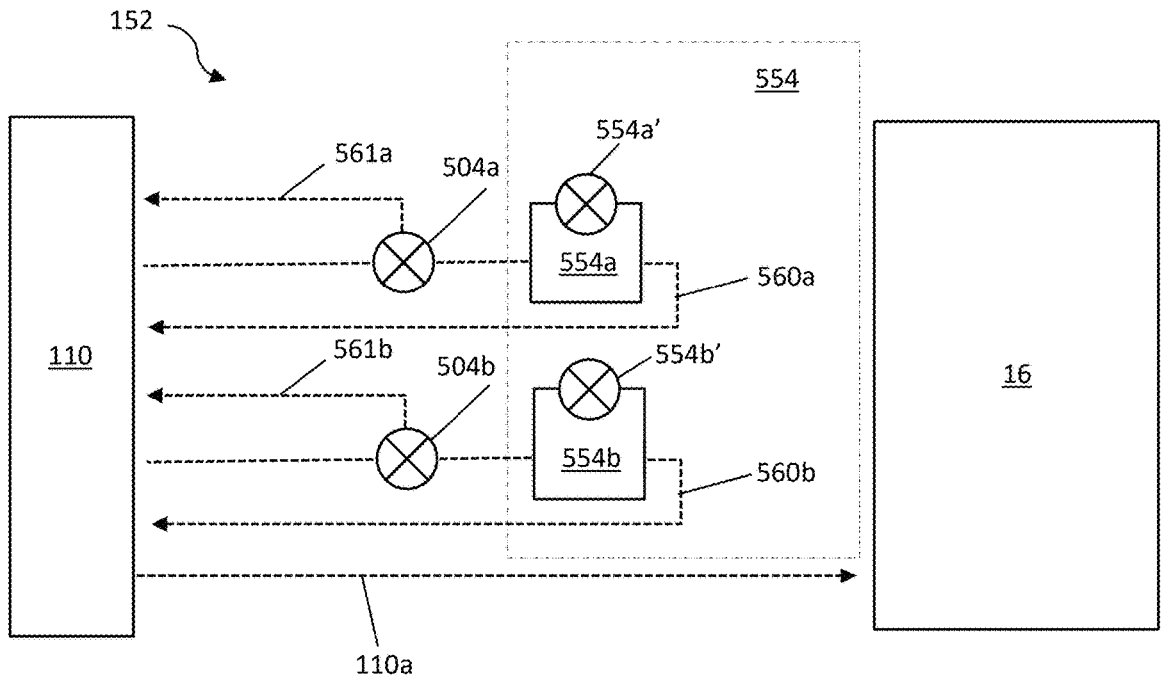
FIG. 11 is a schematic representing a fuel supply system comprising two selectively fueldraulic actuators.

FIG. 11 shows a schematic diagram representing a portion of a fuel supply system 152 of a gas turbine engine 10. The fuel supply system 152 comprises a TCC system 554 comprising two actuators 554a, b, each actuator 554a, b being configured to control a corresponding valve 554a', b' of the TCC system. The valves 255a',b' may supply cool air to cool the turbine case.

The fuel supply system 152 of FIG. 11 is arranged to supply fuel from the fuel source 50, 53 to the combustor 16 and to fueldraulically drive the actuators 554a, b. As described above, the fuel supply system 152 is arranged to selectively actuate or bypass the actuators 554a, b via associated valves 504a, b. In alternative implementations, a single valve can be used to selectively actuate or bypass the actuators 554a, b.

The actuators 554a, b are arranged in different fuel flow loops in the implementation shown in FIG. 11. In other implementations, the actuators 554a, b can be arranged on the same fuel flow loop, and may be arranged in series or in parallel on that loop.

Another example of an actuated system used within turbine engines 10 is a bleed air system. Bleed air systems redirect bleed air (e.g. compressed air taken from the compressor 14, 15, or from elsewhere e.g. from an APU) for use in other systems. Bleed air is useful in various systems because of its relatively high temperature and pressure. Bleed air systems may be referred to as "engine bleed air systems" (EBAS).

Bleed air systems can be used to control the air conditioning within the cabin of an aircraft 1. In such systems, bleed air is filtered and cooled (via expansion and/or heat exchange e.g., with atmospheric air) using a conditioning pack (conditioning packs or Pressurization Air Conditioning Kits (PACKS) are both accepted terms). Air conditioning packs are used to cool and, if appropriate, dehumidify the bleed air from the engine or APU before it is supplied to the aircraft cabin. Such systems comprise one or more valves and one or more actuators. The bleed air is generally fed to the pack via a one-way check valve. In various implementations, one or more of these actuators can be selectively fueldraulic.

Figure 12:
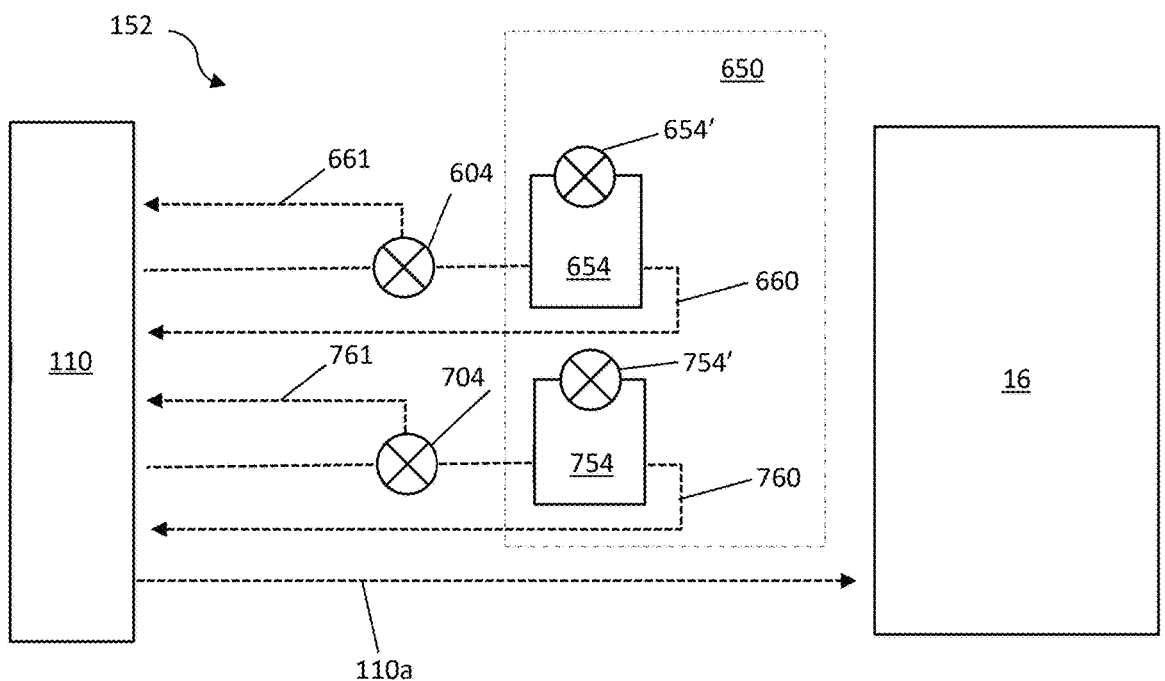
FIG. 12 is a schematic representing a further fuel supply system comprising two selectively fueldraulic actuators.

FIG. 12 shows a schematic diagram representing an alternative portion of a fuel supply system 152 of a gas turbine engine 10, comprising an air conditioning pack 650.

The fuel supply system 152 of FIG. 12 comprises a cabin bleed valve 654' and a cabin bleed actuator 654 configured to control the cabin bleed valve 654' The cabin bleed valve 654' controls the flow of bleed air from the compressor 14, 15 through a conditioning pack (as described above) to supply cooled air to the cabin of the aircraft 1.

The fuel supply system 152 of FIG. 12 further comprises a handling bleed valve 754' and a handling bleed actuator 754 configured to control the handling bleed valve 754'.

The handling bleed valve 754' controls the outlet of bleed air from the compressor 14, 15 and into other aircraft systems. The handling bleed valve 754' can be used for engine starting, transient bleed, and/or surge control.

In some arrangements, there are multiple cabin bleed valves 654' and associated cabin bleed actuators 654, all of which can be thought of as forming part of the air conditioning pack 650. In some arrangements, there are multiple handling bleed valves 754' and associated handling bleed actuators 754, all of which can be thought of as forming part of the air conditioning pack 650.

In alternative arrangements, the cabin bleed valve 654' and cabin bleed actuator 654 are omitted. In alternative arrangements, the handling bleed valve 754' and handling bleed actuator 754 are omitted. In alternative arrangements, alternative known actuators and associated valves can be included and selectively fueldraulically actuated. In some arrangements, other known bleed valves are selectively fueldraulically actuated.

Similarly to actuators described above, the cabin bleed actuator 654 is selectively fueldraulically actuated to control cabin bleed valve 654'. Valve 604 is arranged to direct fuel via line 660 to actuate the cabin bleed actuator 654 or direct fuel via line 661 to bypass the cabin bleed actuator 654.

Similarly to actuators described above, the handling bleed actuator 754 is selectively fueldraulically actuated to control handling bleed valve 754'. Valve 704 is arranged to direct fuel via line 760 to actuate the handling bleed actuator 754 or direct fuel via line 761 to bypass the handling bleed actuator 754.

Another example of an actuated system is a variable guide vane (VGV) system 850. A VGV system controls the amount and/or flow-path of airflow through the compressor 14, 15 (by moving one or more compressor vanes; and generally by moving multiple stages of compressor vanes) to provide optimum compressor performance. The VGV system 850 varies the angle of the vanes of the compressor to manage compressor operability and efficiency.

The variable guide vanes of various implementations may include either or both of variable inlet guide vanes (VIGVs), which are located upstream of/in front of the compressor's rotor blades, and other vanes-generally variable stator vanes (VSVs) which are located behind/downstream of the compressor's rotor blades. Other compressor vanes may be located elsewhere-vane location may vary depending on the engine architecture, and also between compressors of a given engine. For example, intermediate guide vanes which are variable/controllable may be located part way through the compressor 14, 15.

In general, variable guide vanes are arranged to be rotatable about an axis to align with an angle of incoming airflow. This movement of the vanes allows a wider range of non-dimensional flow through the compressor 14, 15 without stall occurring; effectively the compressor 14, 15 can operate without surging over a wider range of engine power settings because of the VGVs. VGVs are controlled by the engine control system in response to a range of parameters, generally including ambient conditions and the level of thrust demanded from the engine.

In engines 10 with multiple compressors 14, 15, a VGV system 850 may be provided for one, some, or all, compressors 14, 15.

Many VGV systems 850 comprise two VGV actuators, which are operable to change the angle of inlet guide vanes of the compressor 14, 15. Each of the two VGV actuators may be configured to control the guide vanes on a given side of the engine 10. In various implementations, one or more of the actuators of a VGV system are fueldraulically driven.

Figure 13:
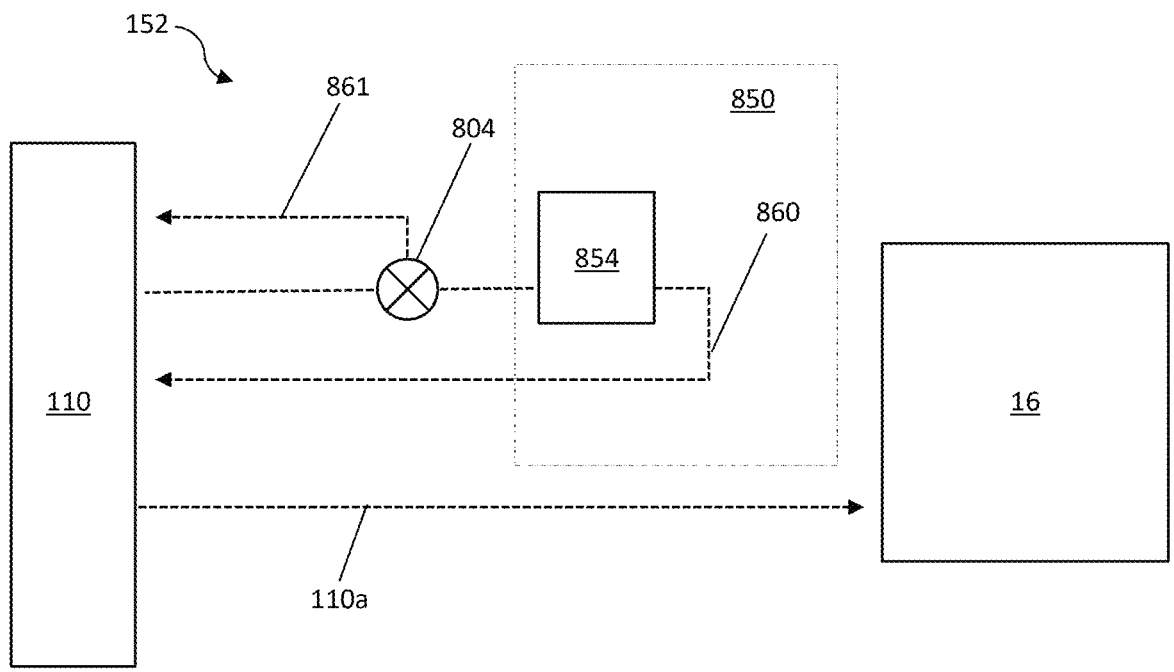
FIG. 13 is a schematic representing a further fuel supply system comprising a selectively fueldraulic actuator.

FIG. 13 shows a schematic diagram representing an alternative portion of a fuel supply system 152 of a gas turbine engine 10 comprising a VGV system 850. The fuel supply system 152 comprises a variable stator vane actuator 854. The fuel supply system 152 comprises a valve 804 configured to selectively fueldraulically actuate the variable stator vane actuator 854 by directing fuel via line 860 or line 861. The valve 804 may be configured to cause fuel to actuate or bypass the variable stator vane actuator 854 based on the SAF content of the fuel. Although the arrangement of FIG. 13 shows a single variable stator vane actuator, in other arrangements the fuel supply system 152 may be arranged to selectively fueldraulically actuate two or more variable stator vane actuators.

Figure 14:
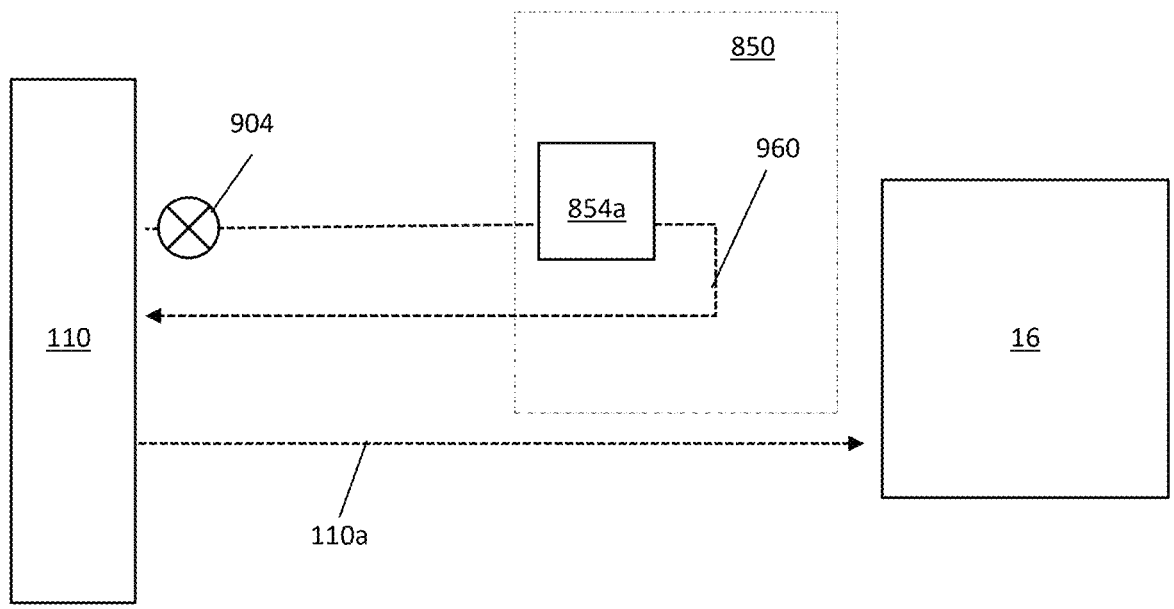
FIG. 14 is a schematic representing a further fuel supply system comprising a selectively fueldraulic actuator.

FIG. 14 shows a schematic diagram representing an alternative portion of a fuel supply system 152 of a gas turbine engine 10 comprising a VGV system 850, similar to that of FIG. 13 but with only a single, simple, fuel offtake loop, with no equivalent of line 861. The fuel supply system 152 comprises a variable inlet guide vane actuator 854*a*. The fuel supply system 152 comprises a valve 904 configured to selectively fueldraulically actuate the variable inlet guide vane actuator 854*a* by directing fuel to the actuator via line 960, or preventing fuel flow along line 960. The valve 904 may be configured to cause fuel to actuate the variable inlet guide vane actuator 854*a*, or to continue along the main fuel flow path 110, therefore bypassing the actuator 854*a*, based on the SAF content of the fuel.

The guide vanes control the flow of air into and through the compressor 14, 15. The variable guide vane actuator(s) 854, 854*a* control the orientation angle of the guide vanes.

Another example of an actuated system used within turbine engines 10 is a heat management system (HMS). Turbine engines 10 often comprise an engine HMS and a generator HMS. Both HMS systems control the temperature of oil by enabling and controlling the use (or bypass) of air-oil (and/or fuel-oil) heat exchangers. Oil-oil heat exchangers can also be used in some implementations, as described in more detail below with respect to FIG. 25. For example, oil-oil heat exchangers can be used to enable heat transfer between oil in a generator HMS and an engine HMS.

The engine HMS system controls the temperature of the oil system that lubricates components of the engine (e.g., bearing chambers, gearbox, etc). The engine HMS system comprises one or more engine HMS valves which are controlled by one or more actuators. In various implementations, one or more of these actuators are fueldraulically driven.

For example, in some implementations, the engine HMS comprises a single valve and a single actuator which is fueldraulically driven and arranged to control the valve.

The engine HMS system may comprise a plurality of heat exchangers arranged in a parallel configuration or series configuration with respect to fluid flow (e.g. fuel flow or oil flow). A single valve controlled by a single fueldraulic actuator may enable the use (or bypass) of all of the heat exchangers—in particular, flow rate of a fluid (air, oil, or fuel, as applicable) may be controlled by the valve, with the proportion of fluid not going through the heat exchanger being directed along a bypass pipe. In some implementations, each heat exchanger has an associated valve controlled by an associated actuator. In various implementations, one or more of these actuators are fueldraulically driven. In addition, one or more recirculation pipes may be provided to allow fluid from a heat exchanger outlet to be returned to the heat exchanger inlet, so passing through the heat exchanger multiple times. Flow through the recirculation pipe(s) may again be adjusted using an actuator-controlled valve. For any of the recirculation pipes described herein, there may be one or more associated pumps configured to convey the air/oil/fuel back through the heat exchanger. Alternatively, or additionally, any suitable components for repressurising the air/oil/fuel to enable recirculation may be used.

Figure 15:
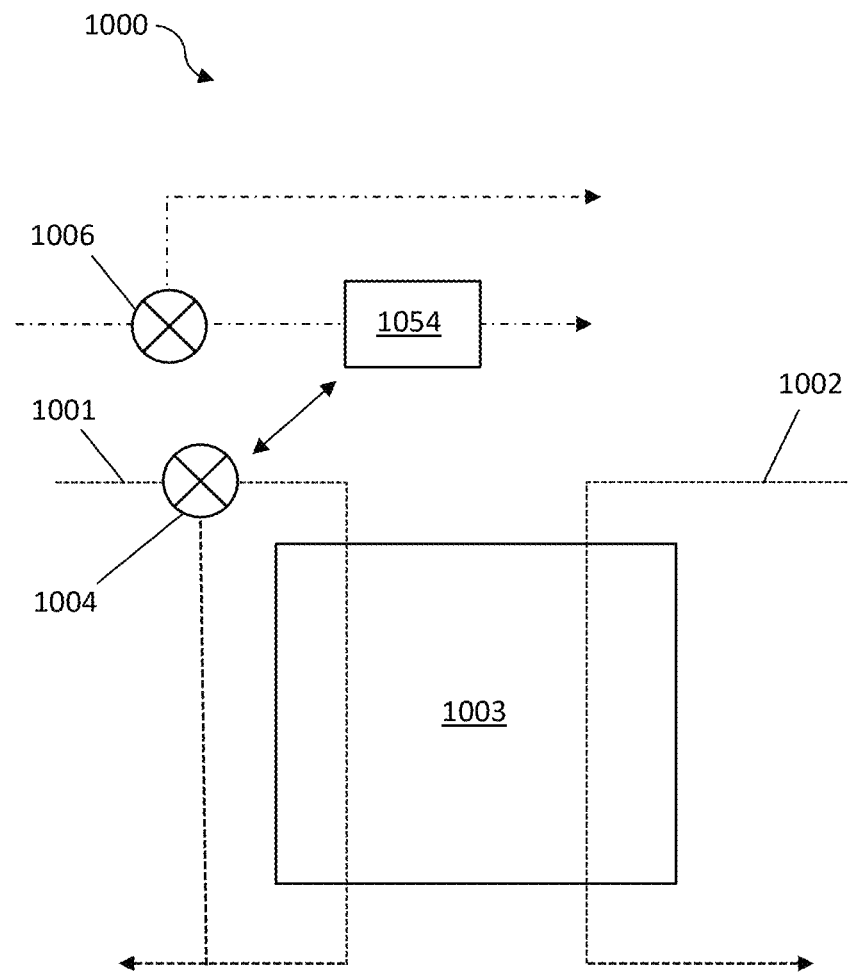
FIG. 15 is a schematic representing a fuel supply system comprising a selectively fueldraulic actuator operable to control a valve within an engine heat management system.

FIG. 15 shows a schematic diagram representing an engine heat management system 1000. The engine heat management system 1000 comprises an air-oil heat exchanger 1003 configured to transfer heat away from oil within the engine. The air-oil heat exchanger 1003 comprises an oil-line 1001 and an air-line 1002. In FIG. 15, the heat exchanger 1003 is a parallel flow heat exchanger, with the oil and air flows being in the dame direction. In other implementations, the heat exchanger 1003 can be a counter-flow heat exchanger, meaning the direction of flow of either the air-line or oil-line is reversed such that they flow through the heat exchanger 1003 in opposite directions.

In the arrangement of FIG. 15, the oil-line 1001 comprises a valve 1004 operable to enable oil to bypass the air-oil heat exchanger 1003. The valve 1004 is controlled via an actuator 1054. The valve 1004 may be binary (on/off), or may be arranged to allow finer control of the oil flow rate through the heat exchanger 1003, with a variable portion of the oil bypassing the heat exchanger 1003.

The actuator 1054 can be selectively fueldraulic, as described in relation to above arrangements. A valve 1006 is operable to enable fuel to flow through the actuator 1054 to fueldraulically actuate the actuator 1054, or to enable fuel to bypass the actuator 1054. In some arrangements, when the valve 1006 causes the fuel to bypass the actuator 1054, the actuator 1054 may be actuated non-fueldraulically.

The valve 1006 may be operable so as to only enable fueldraulic actuation of the actuator 1054 when the SAF content of the fuel is above a predetermined threshold.

Figure 16:
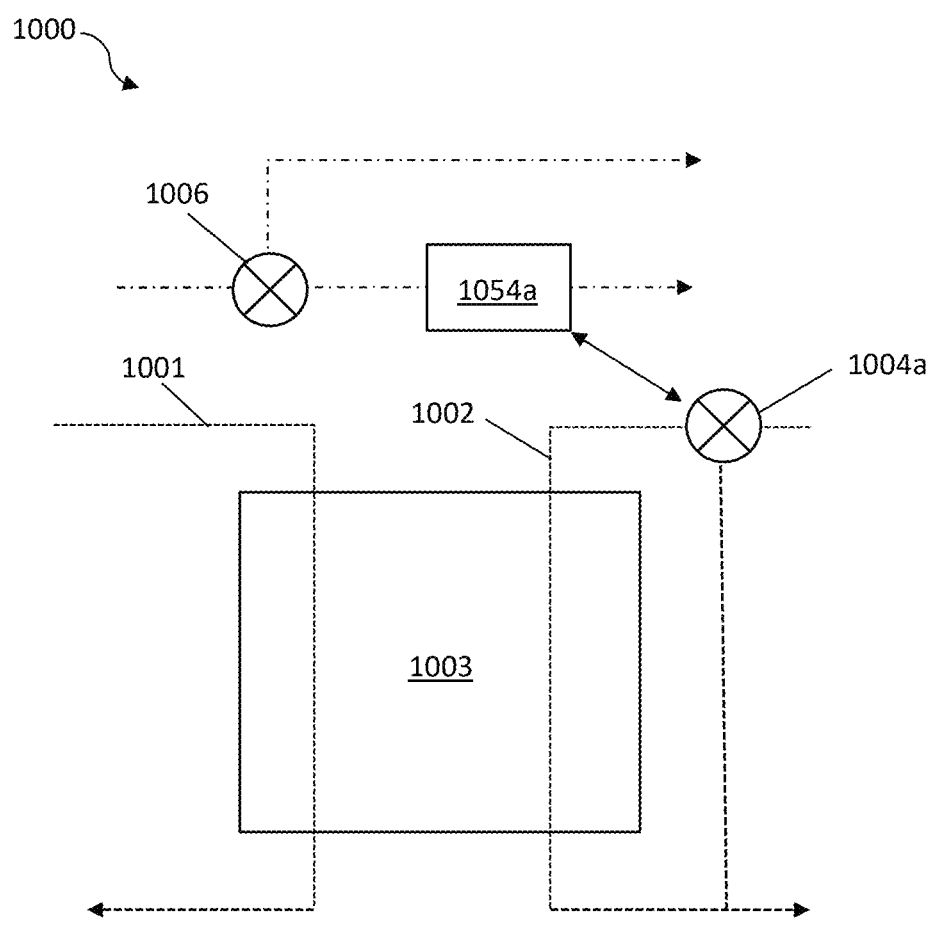
FIG. 16 is a schematic representing a further fuel supply system comprising a selectively fueldraulic actuator operable to control a valve within an engine heat management system.

FIG. 16 shows an alternative arrangement of a heat management system 1000 in which the valve 1004 is positioned within the air-line 1002. The engine heat management system 1000 is similar to the heat management system 1000 of FIG. 15, but the valve 1004 is operable to enable air to bypass the air-oil heat exchanger 1003, so controlling airflow rate therethrough. Again, the fluid flows could be arranged differently in other implementations.

In other implementations, the engine HMS systems 1000 of FIGS. 15 and 16 can be combined such that the HMS system comprises a valve to control both oil flow and air flow. In some implementations, the HMS system 1000 may comprise multiple heat exchangers and a valve arranged to enable the simultaneous bypass of all heat exchangers as well as valves for the bypass of individual heat exchangers.

The generator HMS can be independent from the engine HMS 1000. It provides cooling to an electrical machine that is used, for example, to supply the airframe with electrical power for operating aircraft systems.

Figure 17:
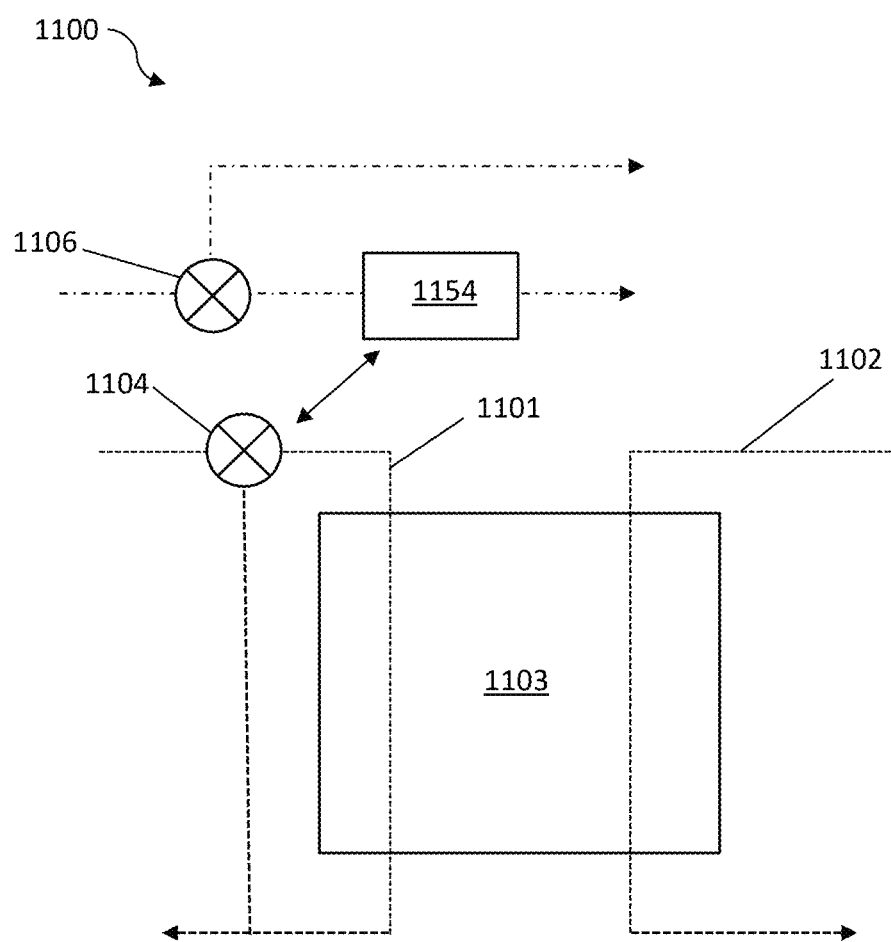
FIG. 17 is a schematic representing a fuel supply system comprising a selectively fueldraulic actuator operable to control a valve within a generator heat management system.

FIG. 17 shows a schematic diagram representing a generator heat management system 1100. The generator heat management system 1100 comprises an air-oil heat exchanger 1103 configured to transfer heat away from oil within the engine, and more specifically to transfer heat away from oil which is being used to cool—and optionally also lubricate—the generator. The air-oil heat exchanger 1103 comprises an oil-line 1101 and an air-line 1102.

In the arrangement of FIG. 17, the oil-line 1101 comprises a valve 1104 operable to enable a controllable amount of the oil to bypass the air-oil heat exchanger 1103. The valve 1104 is controlled via an actuator 1154.

The actuator 1154 can be selectively fueldraulic, as described in relation to above arrangements. A valve 1106 is operable to enable fuel to flow through the actuator 1154 to fueldraulically actuate the actuator, or to enable fuel to bypass the actuator. In some arrangements, the actuator 1154 may be configured to be actuated non-fueldraulically when the valve 1106 causes the fuel to bypass the actuator 1154.

The valve 1106 may be operable so as to only enable fueldraulic actuation of the actuator 1154 when the SAF content of the fuel is above a predetermined threshold.

Figure 18:
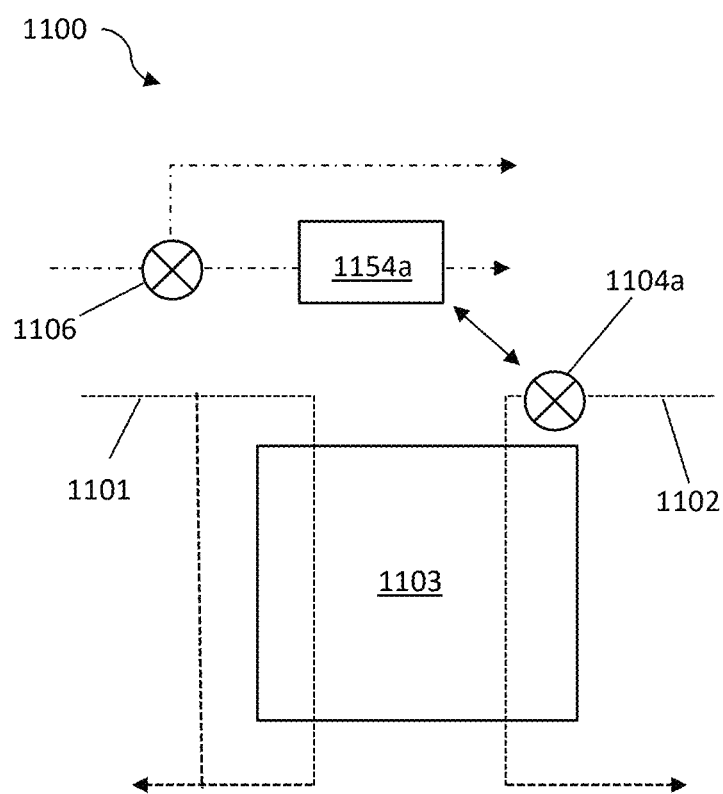
FIG. 18 is a schematic representing a further fuel supply system comprising a selectively fueldraulic actuator operable to control a valve within a generator heat management system.

FIG. 18 shows an alternative arrangement of a generator heat management system 1100 in which the valve 1104 is positioned within the air-line 1102. The generator heat management system 1100 is similar to the generator heat management system 1100 of FIG. 17, but the valve 1104 is operable to enable air to bypass the air-oil heat exchanger 1103. In other implementations, valves may be provided to control fluid flow on both the air side and the oil side.

Figure 19:
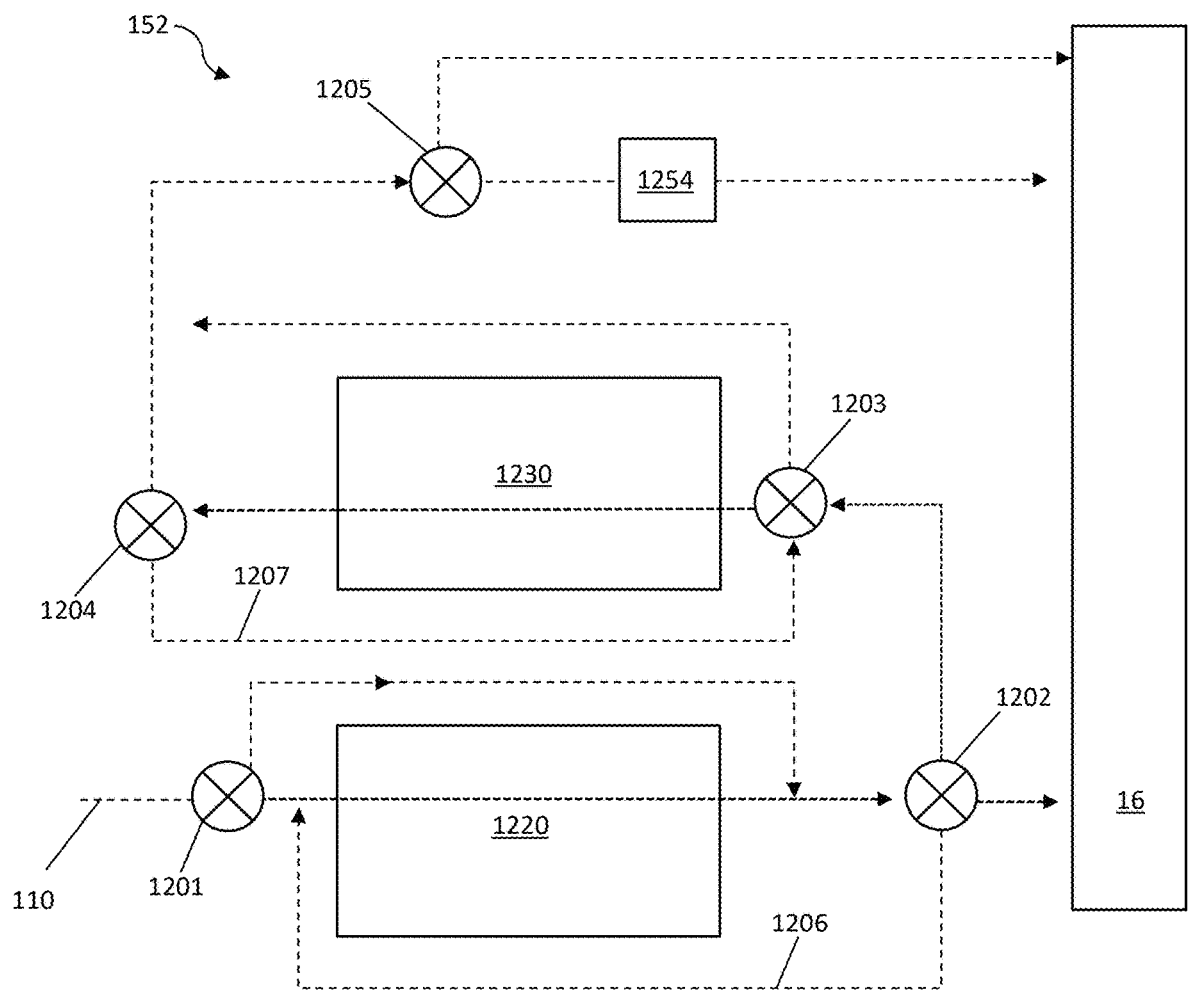
FIG. 19 is a schematic representing a fuel supply system comprising a selectively fueldraulic actuator and two heat exchangers.

FIG. 19 shows a schematic diagram representing a fuel supply system 152 comprising two fuel-oil heat exchangers 1220, 1230. The fuel supply system 152 comprises a primary fuel-oil heat exchanger 1220 and a secondary fuel-oil heat exchanger 1230. The heat exchangers 1220, 1230 are used to transfer heat to the fuel away from the oil, and may be thought of as forming part of the engine heat management system. The primary fuel-oil heat exchanger 1220 is arranged to heat at least the majority of the fuel, and the secondary fuel-oil heat exchanger 1230 is arranged to provide additional heat to the fuel to be supplied to fueldraulically drive at least one fueldraulic actuator 1254.

The fuel supply system 152 of the implementation shown in FIG. 19 comprises five fuel valves 1201-1205. Each valve 1201-1205 is controlled by an actuator, which may be fueldraulic.

The first valve 1201 is a fuel valve arranged to enable fuel to bypass the primary heat exchanger 1220. The valve 1201 can be operable to allow any percentage of fuel to bypass, or pass through, the primary heat exchanger 1220. The diverted fuel is then returned to the main fuel flow path 110.

The primary heat exchanger 1220 allows for the fuel temperature to be increased prior to entry into the combustor 16 whilst reducing the temperature of the oil.

The second valve 1202 is arranged to direct fuel from the outlet of the primary heat exchanger 1220: (i) through a recirculation pipe 1206 configured to direct fuel through back through the primary heat exchanger 1220, (ii) to the combustor 16, or (iii) towards the secondary heat exchanger 1230, for use in one or more fueldraulic systems. Multiple separate valves may be provided for the recirculation or the redirection/offtake to a fueldraulic system in other implementations.

The third valve 1203 forms a part of the fueldraulic system and is a fuel valve arranged to enable a controllable portion of the fuel to bypass the secondary heat exchanger 1230. The valve 1203 can be operable to allow any percentage of fuel to bypass, or pass through, the secondary heat exchanger 1230.

The fourth valve 1204 forms a part of the fueldraulic system and is arranged to direct fuel from downstream of the secondary heat exchanger 1230: (i) to a fueldraulic actuator 1254, or (ii) through a recirculation pipe 1207 configured to direct fuel through back through the secondary heat exchanger 1230, such that some or all of the fuel directed to the secondary heat exchanger 1230 can pass through that heat exchanger multiple times. A fuel recirculation valve 1204 may be provided separately from a valve arranged to control flow to the fueldraulic actuator 1254 in some implementations.

In some arrangements, one or both of the recirculation pipes 1206, 1207 comprise, or are associated with, one or more pumps configured to convey the fuel through the recirculation pipe 1206, 1207. In some arrangements, the pump(s) are positioned upstream of the valve(s) 1202, 1204. In other arrangements, the pump(s) are positioned anywhere along the length of the recirculation pipes 1206, 1207.

The fifth valve 1205 forms a part of the fueldraulic system and is arranged to direct fuel to fueldraulically drive, or bypass, the actuator 1254. In the example shown, fuel which passes through or bypasses the actuator 1254 is then sent directly to the combustor 16. In other implementations, it may be returned to the main fuel flow path 110.

In some arrangements, one or both of the recirculation valves 1202, 1204 can be omitted. In some arrangements, one or both of the bypass valves 1201, 1203 can be omitted.

In some arrangements, the heat exchangers 1220, 1230 are controlled such that, under cruise conditions, a heat transfer ratio of:

$$\frac{\text{rate of heat transform from oil to fuel in}}{\text{the secondary fuel - oil heat exchanger} (kJkg^{-1})}$$
$$\frac{\text{rate of heat transform from oil to fuel in the primary and}}{\text{secondary fuel-oil heat exchangers} (kJkg^{-1})}$$

has a maximum (i.e., peak) value of at least 0.35.

In other arrangements, the heat transfer ratio has a maximum value at cruise greater than 0.4, 0.45, 0.5, 0.55, or 0.6.

In some arrangements, the fuel supply system 152 is arranged to control the heat transfer ratio by controlling the percentages of fuel which bypass, or recirculate through, each of the heat exchangers 1220, 1230.

In additional or alternative arrangements, the heat transfer ratio is controlled by controlling the percentages of oil which bypass, or recirculate through, each of the heat exchangers 1220, 1230. Oil bypass and recirculation valves and/or pipes may be provided accordingly. One or more air-oil or oil-oil heat exchangers may also be controlled so as to influence the heat transfer ratio.

Figure 25:
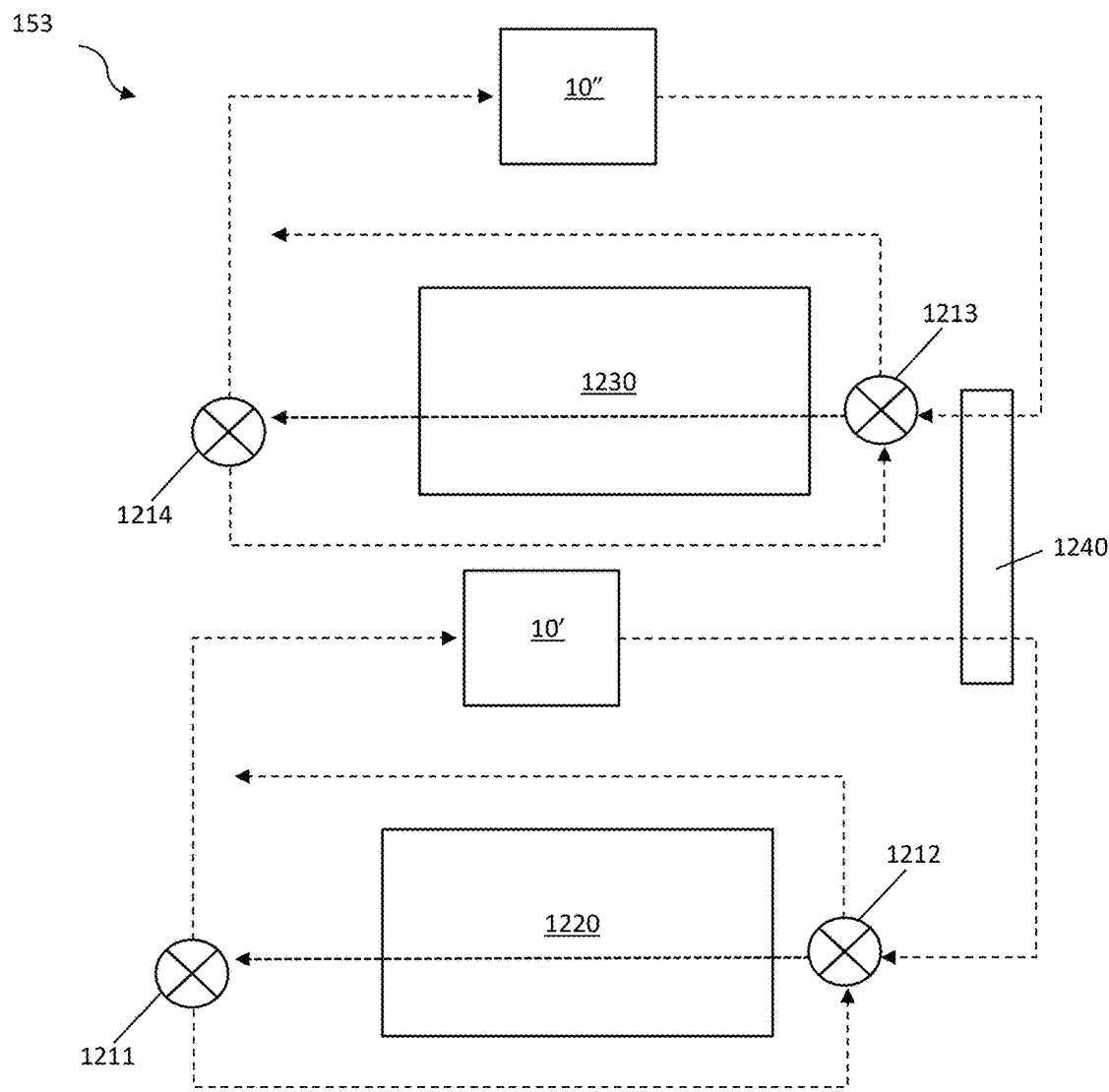
FIG. 25 illustrates an oil supply system for a gas turbine engine comprising two fuel-oil heat exchangers.

One such example oil supply system 153 is shown in FIG. 25. In the implementation of FIG. 25, each fuel-oil heat exchanger 1220, 1230 is on a separate oil loop—the two oil loops are fluidly isolated from each other, and brought into thermal contact by means of an oil-oil heat exchanger 1240 (whilst not shown, it will be appreciated that one or more oil bypass and/or recirculation valves may also be provided in association with the oil-oil heat exchanger 1240).

The oil loop containing oil arranged to pass through the primary fuel-oil heat exchanger 1220 is arranged to cool, and optionally lubricate, a first set of engine components 10'. The oil loop containing oil arranged to pass through the secondary fuel-oil heat exchanger 1230 is arranged to cool, and optionally lubricate, a second set of engine components 10".

Each fuel-oil heat exchanger 1220, 1230 has associated therewith an oil bypass valve 1212, 1213 arranged to allow oil to bypass the respective heat exchanger 1220, 1230. The oil bypass valve 1212, 1213 is arranged to allow a controllable portion of the oil to bypass the respective heat exchanger 1220, 1230 in various implementations.

Each fuel-oil heat exchanger 1220, 1230 has associated therewith an oil recirculation valve 1211, 1214 arranged to allow oil to pass through the respective heat exchanger 1220, 1230 multiple times before returning to the engine components 10', 10" the oil is intended to cool. The oil recirculation valve 1211, 1214 is arranged to allow a controllable portion of the oil to recirculate through the respective heat exchanger 1220, 1230 in various implementations. In the implementation of FIG. 25, the recirculated oil is shown as being fed into the respective bypass valve 1212, 1213; however it will be appreciated that the recirculated oil may re-join the oil flow before or after that valve in other implementations.

In some implementations, only one of an oil recirculation valve 1211, 1214 and an oil bypass valve 1212, 1213 may be provided for one or each heat exchanger 1220, 1230, or neither may be provided for one or each heat exchanger 1220, 1230.

Whilst no air-oil heat exchangers are shown in FIG. 25 for simplicity, it will be appreciated that one or more air-oil heat exchangers may be provided on one or each oil loop in various implementations. Further, in some implementations, a single oil loop may provide oil to both fuel-oil heat exchangers; no oil-oil heat exchanger may be provided in some such implementations.

In some arrangements, the engine 10 is arranged to control the heat transfer ratio based on the SAF content of the fuel.

In some arrangements, the maximum temperature of the fuel exiting the secondary fuel-oil heat exchanger 1230 is at least 145° C., 150° C., 155° C., 160° C., 170° C., or 180° C.

For any of the fueldraulic actuators described above, the fuel supply system 152 can be arranged such that a peak differential pressure of the fuel across the at least one fueldraulic actuator during cruise conditions is at least 2500 kPa, 3000 kPa, 3500 kPa, 4000 kPa, 4500 kPa, 5000 kPa, 5500 kPa, 6000 kPa, 6500 kPa, 7000 kPa, or 7500 kPa.

For any of the fueldraulic actuators described above, the fuel supply system 152 can be arranged such that a peak differential pressure of the fuel across the at least one fueldraulic actuator during take-off is at least 9000 kPa. For any of the fueldraulic actuators described above, the fuel supply system 152 can be arranged such that a peak differential pressure of the fuel across the at least one fueldraulic actuator during take-off may be in the range from 6,900 to 10,000 kPa, at least 10000 kPa, 11,000 kPa, 12,000 kPa, 13,000 kPa, 14,000 kPa, or 15,000 kPa.

The actuator 1254 can be any of the actuators described herein, or any actuator which can be made fueldraulic, such as the variable stator vane actuator.

In some arrangements, the temperature of the fuel on entry to the actuator 1254 (exiting valve 1205) is at least 5° C., 7° C., 10° C., 12° C., 15° C., or 20° C. higher than fuel on entry to the combustor 16 (exiting valve 1202).

In some arrangements, the fuel is thermally stable at temperatures exceeding 280° C. In this context, being "thermally stable" at a stated temperature means that the fuel passes the Jet Fuel Thermal Oxidation Test (JFTOT) at that temperature.

In some arrangements, the fuel is thermally stable at temperatures exceeding 285° C., 290° C., 295° C., 300° C., 305° C., 310° C., 315° C., 320° C., or 325° C.

In some arrangements, aromatics make up less than 5% of the volume of the fuel. In some arrangements, the calorific value of the fuel is at least 43.5 MJkg$^{-1}$. In some arrangements, the calorific value of the fuel is at least 44 MJkg$^{-1}$. In some arrangements, the sulphur content of the fuel is below 15 parts per million. In some arrangements, the fuel is, or comprises, a HEFA fuel.

Various methods for operating a gas turbine engine 10 for an aircraft 1 are described below.

Figure 20:
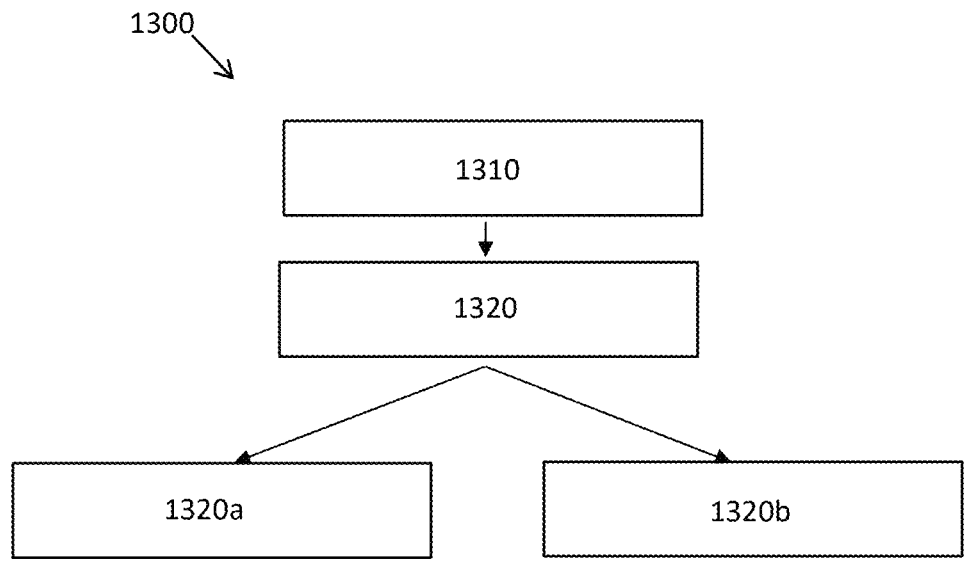
FIG. 20 is a flowchart representing an example method of operating a gas turbine engine.

FIG. 20 shows a flowchart representing a method 1300 of operating a gas turbine engine 10 according to various implementations. The method 1300 is performed for an engine 10 comprising: an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; and a nacelle 21 surrounding the fan 23 and the engine core 11 and defining a bypass duct 22 located radially outside of the engine core 11; a plurality of actuators 254; and a fuel supply system 152.

In the implementations being described, a bypass ratio, defined as the ratio of the mass flow rate of the flow through the bypass duct 22 to the mass flow rate of the flow through the core 11 at cruise conditions, is greater than or equal to 4. Such bypass ratios may be used in any of the engines used to perform any of the methods of FIGS. 20 to 24.

The method 1300 comprises:
supplying 1310, using the fuel supply system 152, fuel for combustion in the combustor 16; and
based on the sustainable aviation fuel—SAF—content of the fuel, selecting 1320 between:
supplying 1320a, using the fuel supply system 152, fuel to at least one actuator 354 of the plurality of actuators and causing the fuel to fueldraulically actuate at least one actuator 354; and
causing 1320b the fuel to bypass the at least one actuator 354, again using the fuel supply system 152.

The step of selecting 1320 between fueldraulically actuating the actuator 354 and bypassing the at least one actuator 354 may comprise making a determination of which action to take in a processor or other computational system based on a comparison of the fuel SAF content to one or more set thresholds, and operating a valve 304 based on that determination. The valve 304 may be a two-way valve configured to direct fuel through a first fuel-line 360 or through a second fuel-line 361, 362, wherein the first fuel-line 360 drives the actuator 354 and the second fuel-line 361, 362 bypasses the actuator 354. The valve 304 may be simply arranged to open an off-take from a main fuel flow pathway 110 only when fueldraulic actuation is required, so allowing all fuel to remain on the main fuel flow pathway 110 when fueldraulic actuation is not required. When fueldraulic actuation is not required, the fuel may therefore bypass the at least one actuator 354 through a dedicated bypass pipe, or simply by remaining on a main fuel flow pathway which does not reach the actuator 354. In implementations with a dedicated bypass pipe, the bypass pipe may be actuator-specific; providing a route for fuel to bypass a single actuator, or may bypass multiple actuators (e.g. some or all actuators located on the same fuel off-take path).

The step of selecting 1320 which action to take may comprise determining whether or not the SAF content of the fuel exceeds a threshold. The fuel supply system 152 may comprise one or more sensors configured to sense one or more parameters which allow the SAF concentration of the fuel to be calculated or inferred (e.g. by detection of a tracer element and reference to a look-up table of fuel tracer elements and SAF contents), and/or may comprise a repository for stored data on the fuel(s) in use. The fuel supply system 152 may comprise a processor or other computational system configured to receive the stored, calculated, or otherwise determined SAF content value and to compare that value to the threshold. A controller may then be used to operate the valve 304 in accordance with the determination. An engine electronic controller (EEC) may be used to make the determination and implement the result in some implementations; in other implementations, a separate, dedicated, computational system may be used instead of using the EEC.

In implementations with multiple fueldraulic actuators 354, a different threshold may be set for different actuators, or the same threshold may be used for all actuators.

The fuel used to fueldraulically drive the at least one actuator 354 may then be supplied to the combustor 16 to be burned; either directly or after being returned to the main fuel flow path 110. Fuel may flow along a main fuel flow path 110 to the combustor 16—the main fuel flow path 110 may therefore supply 1310 the fuel to the combustor 16. A portion of the fuel flowing along the main fuel flow path 110 may be diverted off the main fuel flow path 110 to the at least one actuator 354—this fuel may then be returned to the main fuel flow path 110 after its use in actuation. One or more pipes may be used to take fuel from the main fuel flow path 110 to the at least one actuator 354. These pipes may form one or more fuel flow loops. One or more valves may be used to control the fuel flow rate through the, or each, fueldraulic fuel flow loop. In some implementations, one or more fueldraulic fuel pumps may be provided to actively pump the fuel to or from the at least one actuator 354— however, in many implementations, the pressure provided by one or more fuel pumps on the main fuel flow path 110 may suffice.

The offtake 159 from the main fuel flow path 110 may be located at a different point along the main fuel flow path 110 from the return pipe 160 of the (or each) fuel flow loop, as shown in FIG. 6. The fuel may be returned to the main fuel flow path 110 at a location upstream of, or downstream of, the offtake. One or more valves may be used to control the location(s) along the main fuel flow path 110 at which the fuel used to drive the actuators is returned to the main fuel flow path 110. For example, fuel used in actuation may be returned to a fuel tank 50, 53, to just before the combustor 16, or to before or after any fuel-oil heat exchanger or fuel pump along the main fuel flow path 110 or within a fueldraulic system, as appropriate. In general, fuel used in actuation is returned to a point on the main fuel flow path 110 within the engine 10 (as opposed to being returned directly to a fuel tank 50, 53 lying elsewhere in the aircraft 1, or to a connecting pipe therebetween, for example).

The supplying steps 1310, 1320a may therefore comprise controlling a plurality of fuel flow valves, and optionally also a plurality of fuel pumps.

Figure 21:
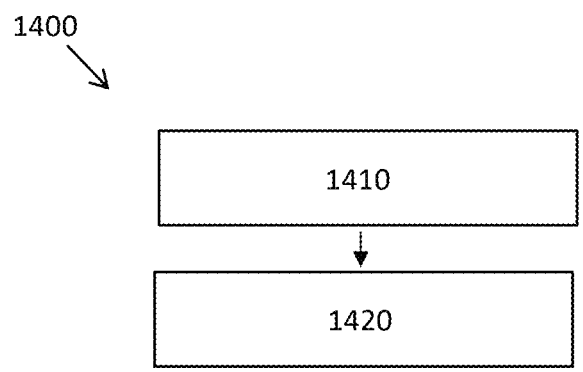
FIG. 21 is a flowchart representing a further example method of operating a gas turbine engine.

FIG. 21 shows a flowchart representing a method 1400 of operating a gas turbine engine 10 according to various implementations. The method 1400 is performed for an engine 10 comprising: an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; and a nacelle 21 surrounding the fan 23 and the engine core 11 and defining a bypass duct 22 located radially outside of the engine core 11; a plurality of actuators 254; and a fuel supply system 152.

The method 1400 comprises:
supplying 1410, using the fuel supply system 152, fuel for combustion in the combustor 16;
supplying 1420, using the fuel supply system 152, fuel to fueldraulically drive at least one actuator 354 of the plurality of actuators such that a peak differential pressure of the fuel across the at least one fueldraulic actuator 354 during cruise conditions is at least 2400 kPa.

The supplied fuel has a SAF content of at least 25% by volume, and may have a much higher SAF content. The peak differential pressure may be controlled to be higher when the SAF content is higher.

As described with respect to the method 1300 of FIG. 20, one or more fuel flow loops and associated valves may be used to control how much fuel is diverted from a main fuel flow path 110 to the actuated systems, and to where along the main fuel flow path 110 that fuel is returned.

Similarly, one or more valves and/or pumps may be controlled 1420 as appropriate to control the peak differential pressure of the fuel across the fueldraulic actuator 354. One or more pressure sensors may be provided to provide feedback on the differential fuel pressure. It will be appreciated that controlling the supply 1420 of fuel to the actuator (s) 354 allows the differential pressure to be adjusted.

Figure 22:
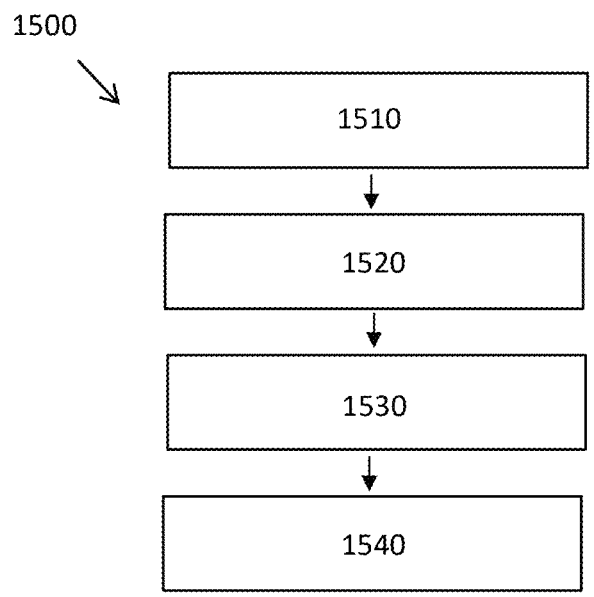
FIG. 22 is a flowchart representing a further example method of operating a gas turbine engine.

FIG. 22 shows a flowchart representing a method 1500 of operating a gas turbine engine 10 according to various implementations. The method 1500 is performed for an engine 10 comprising: an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; and a nacelle 21 surrounding the fan 23 and the engine core 11 and defining a bypass duct 22 located radially outside of the engine core 11; a plurality of actuators 254; a fuel supply system 152; a primary fuel-oil heat exchanger 1220 and a secondary fuel-oil heat exchanger 1230.

The method 1500 comprises:
supplying 1510, using the fuel supply system 152, fuel for combustion in the combustor 16;
supplying 1520, using the fuel supply system 152, fuel to fueldraulically drive at least one actuator 354 of the plurality of actuators;
heating 1530 at least the majority of the fuel using the primary fuel-oil heat exchanger 1220; and
(further) heating 1540 the fuel to be supplied to fueldraulically drive the at least one fueldraulic actuator using the secondary fuel-oil heat exchanger 1230.

The method comprises controlling the heating of the fuel in the heat exchangers 1220, 1230 such that, under cruise conditions, a heat transfer ratio of:

$$\frac{\text{rate of heat transform from oil to fuel in}}{\text{the secondary fuel} - \text{oil heat exchanger} (kJkg^{-1})}{\text{rate of heat transform from oil to fuel in the primary and}\atop\text{secondary fuel-oil heat exchangers} (kJkg^{-1})}$$

has a maximum value of at least 0.35.

The primary fuel-oil heat exchanger 1220 may be configured to transfer heat away from oil within the engine 10 which is used to lubricate and cool various engine components, such as a gearbox (where present) and/or shaft bearings. The secondary fuel-oil heat exchanger 1230 may be configured to transfer heat away from oil which is being used to cool—and optionally also lubricate—the generator. Different, fluidly-isolated, flows of oil may pass through each of the primary fuel-oil heat exchanger 1220 and the secondary fuel-oil heat exchanger 1230 in some implementations, as shown in FIG. 25. In other implementations, the same oil may pass through both heat exchangers—for example passing through the secondary fuel-oil heat exchanger 1230 and then through the primary fuel-oil heat exchanger 1220 in series.

The heat transfer ratio may be controlled by opening and closing valves so as to enable: fuel recirculation through either or both of heat exchangers 1220, 1230, fuel bypass of either or both of the heat exchangers 1220, 1230, oil recirculation through either or both of the heat exchangers 1220, 1230, or oil bypass of either or both of the heat exchangers 1220, 1230. In addition, one or more further heat exchangers may be controlled to adjust the heat transfer ratio—for example, an air-oil heat exchanger may be used to cool oil before it reaches a fuel-oil heat exchanger 1220, 1230, and in implementations with multiple different flows of oil, an oil-oil heat exchanger may be provided to transfer heat between the different oils. Flows of air and/or oil into such heat exchangers may therefore also be adjusted so as to affect the heat transfer ratio defined above.

The heat transfer ratio may be controlled via control of one or more valves configured to enable a percentage of the fuel to recirculate through one or both of the fuel-oil heat exchangers 1220, 1230 or bypass one or both of the heat exchangers 1220, 1230. The heat transfer ratio may be controlled via control of one or more valves configured to enable a percentage of the oil to recirculate through one or both of the heat exchangers 1220, 1230 or bypass one or both of the heat exchangers 1220, 1230.

As described with respect to the methods 1300, 1400 of FIGS. 20 and 21, one or more fuel flow loops and associated valves may be used to control how much fuel is diverted from a main fuel flow path 110 to the actuator(s) and the secondary heat exchanger 1230, and to where along the main fuel flow path 110 that fuel is returned.

Figure 23:
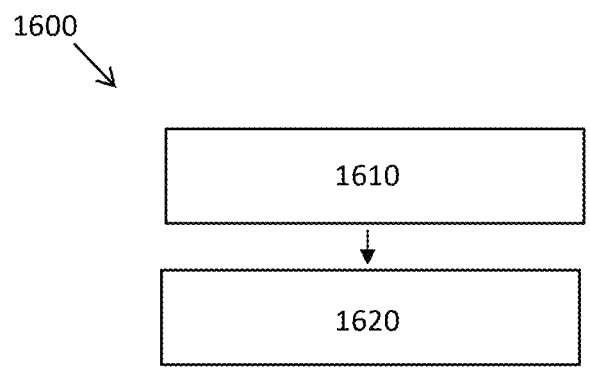
FIG. 23 is a flowchart representing a further example method of operating a gas turbine engine.

FIG. 23 shows a flowchart representing a method 1600 of operating a gas turbine engine 10 according to various implementations. The method 1600 is performed for an engine 10 comprising: an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; and a nacelle 21 surrounding the fan 23 and the engine core 11 and defining a bypass duct 22 located radially outside of the engine core 11; a plurality of actuators comprising a variable stator vane actuator 854; and a fuel supply system 152.

The method 1600 comprises:

supplying 1610, using the fuel supply system 152, fuel for combustion in the combustor 16; and supplying 1620, using the fuel supply system 152, fuel to fueldraulically drive the variable compressor vane actuator 854 of the plurality of actuators.

Supplying 1620, using the fuel supply system 152, fuel to fueldraulically drive the variable compressor vane actuator 854 and to the combustor 16 may comprise supplying fuel which is thermally stable at 280° C., and optionally also thermally stable at higher temperatures.

As described with respect to the methods 1300, 1400, 1500 of FIGS. 20-22, one or more fuel flow loops and associated valves may be used to control how much fuel is diverted from a main fuel flow path 110 to the actuated systems—and in particular to the variable stator vane actuator 854, and to where along the main fuel flow path 110 that fuel is returned.

Figure 24:
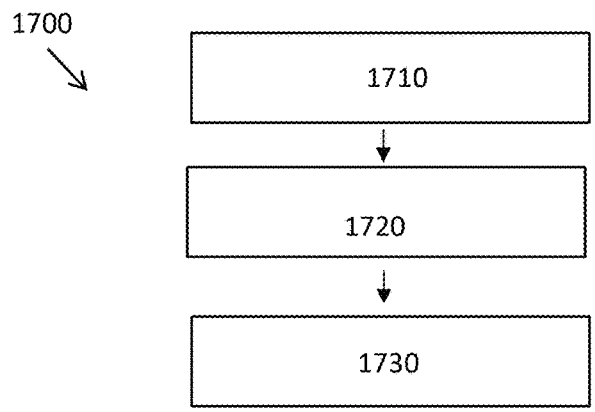
FIG. 24 is a flowchart representing a further example method of operating a gas turbine engine.

FIG. 24 shows a flowchart representing a method 1700 of operating a gas turbine engine 10 according to various implementations. The method 1700 is performed for an engine 10 comprising: an engine core 11 comprising a turbine 19, a combustor 16, a compressor 14, and a core shaft 26 connecting the turbine to the compressor; a fan 23 located upstream of the engine core 11 and arranged to be driven by the core shaft 26, the fan comprising a plurality of fan blades; and a nacelle 21 surrounding the fan 23 and the engine core 11 and defining a bypass duct 22 located radially outside of the engine core 11; a plurality of actuators 254; a fuel supply system 152; and at least one fuel-oil heat exchanger 1220 arranged to have oil and the fuel flow therethrough, the at least one heat exchanger 1220 being arranged to transfer heat from the oil to the fuel.

The method 1700 comprises:

supplying 1710, using the fuel supply system 152, fuel for combustion in the combustor 16;

supplying 1720 supply fuel to fueldraulically drive at least one actuator 1254 of the plurality of actuators; and controlling 1730 the at least one heat exchanger 1220 such that, at cruise, the fuel temperature on entry into the at least one actuator 1254 is at least 5° C. greater than the fuel temperature on entry to the combustor 16 (and optionally at least 10° C. warmer).

The fuel supply system 152 may comprise two heat exchangers—a primary heat exchanger 1220 and a secondary heat exchanger 1230. Controlling 1730 the at least one heat exchanger 1220 may comprise controlling the primary heat exchanger 1220 and/or the secondary heat exchanger 1230. The secondary heat exchanger 1230 may be arranged to provide additional heat just to the fuel to be supplied to the fueldraulic actuator(s) 1254.

The method 1700 may comprise determining at least one fuel characteristic of the fuel and controlling a temperature difference between the fuel temperature on entry into the at least one actuator 1254 and the fuel temperature on entry to the combustor 16 based on the at least one fuel characteristic. The fuel characteristic may be the SAF content of the fuel. The fuel characteristic may be determined by any approach known in the art, ranging from data retrieval from an onboard data store of fuel information to determination or inference from one or more sensed parameters.

The fuel characteristic may be or comprise calorific value, thermal stability, or the percentage of sustainable aviation fuel (SAF) in the fuel.

Controlling 1730 the fuel temperature on entry into the at least one actuator 1254 relative to the fuel temperature on entry into the combustor 16 can comprise actuating one or more valves so as to recirculate fuel through one or more of the heat exchangers or bypass fuel around one or more of the heat exchangers 1220, 1230.

Controlling 1730 the fuel temperature on entry into the at least one actuator 1254 relative to the fuel temperature on entry into the combustor 16 can comprise actuating one or more valves so as to recirculate oil through the heat exchanger 1220, 1230 or bypass oil around the heat exchanger.

As described with respect to the methods 1300, 1400, 1500, 1600 of FIGS. 20-23, one or more fuel flow loops and associated valves may be used to control how much fuel is diverted from a main fuel flow path 110 to the actuated systems, and to where along the main fuel flow path 110 that fuel is returned.

It will be understood that the invention is not limited to the implementations above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft comprising:
    an engine core comprising a turbine, a combustor, a compressor, and a core shaft connecting the turbine to the compressor;
    a fan located upstream of the engine core and arranged to be driven by the core shaft, the fan comprising a plurality of fan blades;
    a nacelle surrounding the fan and the engine core and defining a bypass duct located radially outside of the engine core, where a bypass ratio, defined as a ratio of a mass flow rate of a flow through the bypass duct to a mass flow rate of a flow through the engine core at cruise conditions, is at least 4;
    a plurality of actuators;
    a fuel supply system, wherein the fuel supply system is arranged to supply fuel for combustion in the combustor, and to supply fuel to fueldraulically drive at least one actuator of the plurality of actuators;
    two fuel-oil heat exchangers arranged to have oil and the fuel flow therethrough, the heat exchangers being arranged to transfer heat from the oil to the fuel and comprising a primary fuel-oil heat exchanger arranged to heat at least a majority of the fuel, and a secondary fuel-oil heat exchanger arranged to provide additional heat to the fuel to be supplied to fueldraulically drive the at least one fueldraulic actuator;
    a first fuel recirculation valve operable to enable fuel to recirculate through the primary heat exchanger;
    a second fuel recirculation valve operable to enable fuel to recirculate through the secondary heat exchanger; and
    a controller configured to control the first fuel recirculation valve and the second recirculation valve such that, under cruise conditions, a heat transfer ratio of:

$$\frac{\text{rate of heat transform from oil to fuel in the secondary fuel–oil heat exchanger}}{\text{rate of heat transform from oil to fuel in the primary and secondary fuel–oil heat exchangers}}$$

has a maximum value of at least 0.35.

2. The gas turbine engine of claim 1, wherein the heat transfer ratio has a maximum value at cruise greater than 0.4.

3. The gas turbine engine of claim 1, wherein the heat transfer ratio has a maximum value at cruise greater than 0.45.

4. The gas turbine engine of claim 1, wherein the heat transfer ratio has a maximum value at cruise of 0.5.

5. The gas turbine engine of claim 1, wherein the maximum temperature of the fuel exiting the secondary fuel-oil heat exchanger is at least 150° C.

6. The gas turbine engine of claim 1, wherein the maximum temperature of the fuel exiting the secondary fuel-oil heat exchanger is at least 160° C.

7. The gas turbine engine of claim 1, wherein the maximum temperature of the fuel exiting the secondary fuel-oil heat exchanger is at least 170° C.

8. The gas turbine engine of claim 1, wherein the primary and secondary heat exchangers are arranged such that the heat transfer ratio is adjustable in operation of the engine.

9. The gas turbine engine of claim 1, further comprising an oil valve operable to enable oil to bypass the primary heat exchanger.

10. The gas turbine engine of claim 1, further comprising an oil valve operable to enable oil to bypass the secondary heat exchanger.

11. The gas turbine engine of claim 1, further comprising a fuel valve operable to enable fuel to bypass the primary heat exchanger.

12. The gas turbine engine of claim 1, further comprising a fuel valve operable to enable fuel to bypass the secondary heat exchanger.

13. The gas turbine engine of claim 1, further comprising an oil recirculation valve operable to enable oil to recirculate through the primary heat exchanger.

14. The gas turbine engine of claim 1, further comprising an oil recirculation valve operable to enable oil to recirculate through the secondary heat exchanger.

15. The gas turbine engine of claim 1, wherein the fuel supply system comprises a fuel recirculation valve operable to enable fuel to recirculate through the primary heat exchanger.

16. The gas turbine engine of claim 1, wherein the fuel supply system comprises a fuel recirculation valve operable to enable fuel to recirculate through the secondary heat exchanger.

17. The gas turbine engine of claim 1, wherein the core shaft outputs drive to the fan directly, so as to drive the fan at the same rotational speed as core shaft, such that the engine is a direct drive turbine engine.

18. A method of operating a gas turbine engine for an aircraft, the engine comprising:
    an engine core comprising a turbine, a combustor, a compressor, and a core shaft connecting the turbine to the compressor;
    a fan located upstream of the engine core and arranged to be driven by the core shaft, the fan comprising a plurality of fan blades;
    a nacelle surrounding the fan and the engine core and defining a bypass duct located radially outside of the engine core, where a bypass ratio, defined as a ratio of a mass flow rate of a flow through the bypass duct to a mass flow rate of a flow through the engine core at cruise conditions, is at least 4;
    a plurality of actuators;
    a fuel supply system;
    a primary fuel-oil heat exchanger and a secondary fuel-oil heat exchanger;

a first fuel recirculation valve operable to enable fuel to recirculate through the primary heat exchanger; and
a second fuel recirculation valve operable to enable fuel to recirculate through the secondary heat exchanger;
wherein the method comprises:
supplying, using the fuel supply system, fuel for combustion in the combustor;
supplying, using the fuel supply system, fuel to fueldraulically drive at least one actuator of the plurality of actuators;
heating at least a majority of the fuel using the primary fuel-oil heat exchanger; and
heating the fuel to be supplied to fueldraulically drive the at least one fueldraulic actuator using the secondary fuel-oil heat exchanger;
controlling the first fuel recirculation valve and the second recirculation valve so as to obtain, under cruise conditions, a heat transfer ratio of:

$$\frac{\text{rate of heat transform from oil to fuel in the secondary fuel} - \text{oil heat exchanger}}{\text{rate of heat transform from oil to fuel in the primary and secondary fuel} - \text{oil heat exchangers}}$$

having a maximum value of at least 0.35.

19. The method of claim 18, further comprising adjusting the heat transfer ratio based on the sustainable aviation fuel—SAF—content of the fuel.

* * * * *